US011019594B2

(12) United States Patent
Anami

(10) Patent No.: US 11,019,594 B2
(45) Date of Patent: May 25, 2021

(54) WIRELESS COMMUNICATION DEVICE, WIRELESS COMMUNICATION TERMINAL, WIRELESS COMMUNICATION SYSTEM, WIRELESS COMMUNICATION METHOD, AND STORAGE MEDIUM

(71) Applicant: NEC CORPORATION, Tokyo (JP)

(72) Inventor: Shinichi Anami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/480,018

(22) PCT Filed: Jan. 22, 2018

(86) PCT No.: PCT/JP2018/001733
§ 371 (c)(1),
(2) Date: Jul. 23, 2019

(87) PCT Pub. No.: WO2018/139397
PCT Pub. Date: Aug. 2, 2018

(65) Prior Publication Data
US 2019/0373574 A1    Dec. 5, 2019

(30) Foreign Application Priority Data

Jan. 26, 2017    (JP) .............................. JP2017-012174

(51) Int. Cl.
*H04W 76/02*    (2009.01)
*H04W 76/00*    (2018.01)
*H04W 64/00*    (2009.01)
*H04W 4/38*    (2018.01)
(Continued)

(52) U.S. Cl.
CPC ........... *H04W 64/003* (2013.01); *H04W 4/33* (2018.02); *H04W 4/38* (2018.02); *H04W 36/08* (2013.01)

(58) Field of Classification Search
CPC .......................... H04B 1/713; H04W 72/0453; H04W 64/003; H04W 4/33; H04W 52/243;
(Continued)

(56) References Cited

U.S. PATENT DOCUMENTS

2011/0069638 A1    3/2011  Ishizu et al.
2013/0017791 A1*   1/2013  Wang .................... H04W 16/14
                                                                455/41.2
(Continued)

FOREIGN PATENT DOCUMENTS

JP    2011-071625 A    4/2011
JP    2014-165872 A    9/2014
(Continued)

OTHER PUBLICATIONS

International Search Report of PCT/JP2018/001733 dated Mar. 20, 2018 [PCT/ISA/210].
(Continued)

*Primary Examiner* — Gary Lafontant

(57) ABSTRACT

Provided are a wireless communication device, a wireless communication terminal, a wireless communication system, a wireless communication method, and a storage medium that can realize reliable and stable wireless communication even in an unstable radio environment. The wireless communication device includes: a wireless communication unit capable of wirelessly communicating with a wireless communication terminal; and a communication control unit that controls at least one of switching of a frequency band of the wireless communication and switching of the wireless communication terminal based on at least one of time information and peripheral information indicating a status of a peripheral object.

15 Claims, 19 Drawing Sheets

(51) Int. Cl.
*H04W 4/33* (2018.01)
*H04W 36/08* (2009.01)

(58) Field of Classification Search
CPC ... H04W 52/244; H04W 60/04; H04W 84/12; H03J 7/02
See application file for complete search history.

(56) References Cited

U.S. PATENT DOCUMENTS

2014/0378179 A1* 12/2014 Nagai ............... H04W 16/14 455/509
2015/0110004 A1* 4/2015 Katz .................... H04L 1/0079 370/329
2017/0111565 A1* 4/2017 Shibahara ............ H04N 21/242
2018/0309499 A1* 10/2018 Matsutaka ............ H04W 36/32

FOREIGN PATENT DOCUMENTS

| | | |
|---|---|---|
| JP | 2014-232992 A | 12/2014 |
| JP | 2016-192693 A | 11/2016 |
| JP | 6062114 B1 | 1/2017 |
| WO | 2013/179397 A1 | 12/2013 |

OTHER PUBLICATIONS

Communication dated Sep. 1, 2020, from the Japanese Patent Office in application No. 2018-564548.

* cited by examiner

FIG. 6A

| Working period | 9:00 to 12:00, 13:00 to 17:00 |
|---|---|
| Rest period | 12:00 to 13:00 |

FIG. 6B

| Date<br>Apparatus No. | 12 / 12<br>6  12  18 (hour) | 12 / 13<br>6  12  18 (hour) | ... |
|---|---|---|---|
| Apparatus N1 | ▨ | ▨ | ... |
| Apparatus N2 | ▨ | ▨ | ... |
| Apparatus N3 | ▨ | ▨ | ... |
| ⋮ | | | |

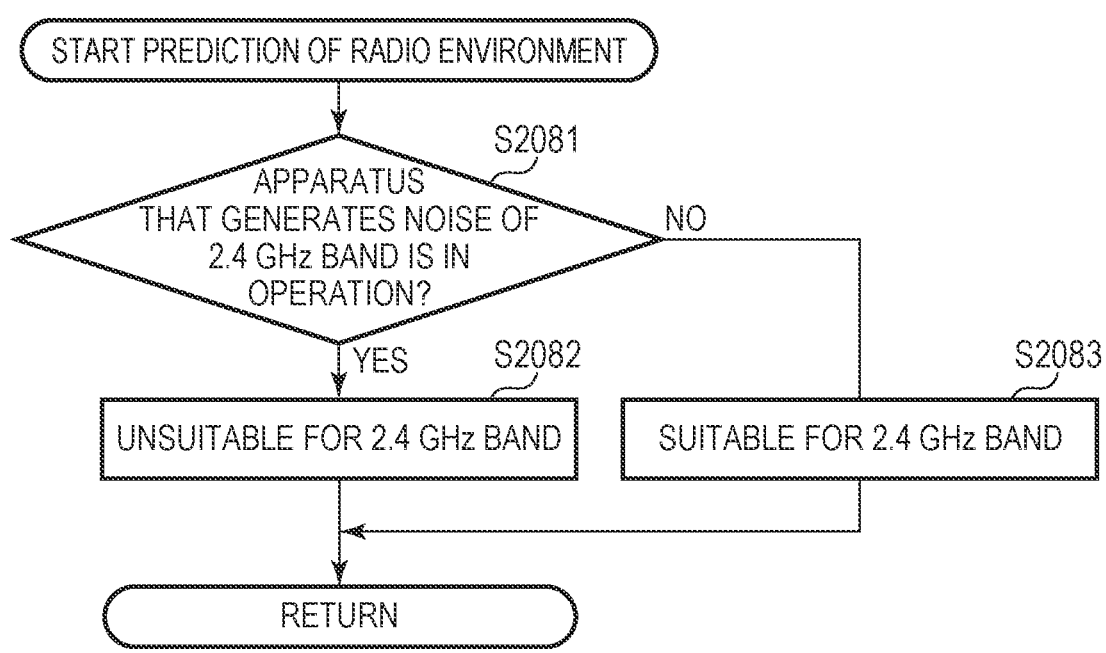

WIRELESS COMMUNICATION DEVICE, WIRELESS COMMUNICATION TERMINAL, WIRELESS COMMUNICATION SYSTEM, WIRELESS COMMUNICATION METHOD, AND STORAGE MEDIUM

CROSS REFERENCE TO RELATED APPLICATIONS

This application is a National Stage of International Application No. PCT/JP2018/001733, filed Jan. 22, 2018, claiming priority to Japanese Patent Application No. 2017-012174, filed Jan. 26, 2017, the contents of all of which are incorporated herein by reference in their entirety.

TECHNICAL FIELD

The present invention relates to a wireless communication device, a wireless communication terminal, a wireless communication system, a wireless communication method, and a storage medium.

BACKGROUND ART

Wireless communication technologies have been widely used as a communication technology in the information society. A wireless communication technology may be, for example, a mobile communication technology such as a cellular phone, a wireless Local Area Network (LAN), or the like. Further, in Internet of Things (IoT) where a variety of things are connected to a network, a wireless communication technology has been one of the technologies that serve an important role.

Wireless communication transmits information by using a radio wave and therefore has characteristics of a signal attenuating in accordance with a propagation distance, interference occurring among wireless communication systems, being influenced by an obstruction object, or the like. Thus, in wireless communication, a technology that ensures reliability or stability of the wireless communication is important.

Patent Literature 1 discloses a wireless communication device that is connectable to a plurality of radio base stations and intends to realize stable data communication. In the wireless communication device disclosed in Patent Literature 1, radio quality information on the radio quality with respect to each of the radio base stations is periodically measured, and execution of handover to switch the radio base station that is a target of wireless communication is predicted based on the measured radio quality information. Furthermore, a candidate radio base station that is a new target of wireless communication is estimated based on first radio quality information measured after the execution of handover is predicted and second radio quality information measured after a predetermined handover execution condition is satisfied.

CITATION LIST

Patent Literature

PTL 1: Japanese Patent Application Laid-Open No. 2014-232992

SUMMARY OF INVENTION

Technical Problem

In the wireless communication device disclosed in Patent Literature 1, however, handover is executed when wireless quality information such as a received electric field level, a signal to noise (SN) ratio, or the like decreases below a threshold. Thus, it is difficult to avoid deterioration of a communication state, and it is difficult to realize reliable and stable wireless communication.

In particular, within a facility such as a factory, an unstable radio environment may occur due to a noise source that interferes with a radio wave of wireless communication, an obstruction object that obstructs a radio wave, or the like. Even in such an unstable radio environment, there is a demand for realizing reliable and stable wireless communication.

The present invention intends to provide a wireless communication device, a wireless communication terminal, a wireless communication system, a wireless communication method, and a storage medium that can realize reliable and stable wireless communication even in an unstable radio environment.

Solution to Problem

According to one aspect of the present invention, provided is a wireless communication device including: a wireless communication unit capable of wirelessly communicating with a wireless communication terminal; and a communication control unit that controls at least one of switching of a frequency band of the wireless communication and switching of the wireless communication terminal based on at least one of time information and peripheral information indicating a status of a peripheral object.

According to another aspect of the present invention, provided is a wireless communication terminal including: a wireless communication unit capable of wirelessly communicating with a wireless communication device; and a communication control unit that controls at least one of switching of a frequency band of the wireless communication and switching of the wireless communication device based on at least one of time information and peripheral information indicating a status of a peripheral object.

According to yet another aspect of the present invention, provided is a wireless communication system including: a wireless communication terminal; a wireless communication device capable of wirelessly communicating with the wireless communication terminal; and a communication control unit that, based on at least one of time information and peripheral information indicating the status of a peripheral object, controls at least one of switching of a frequency band of the wireless communication and switching of the wireless communication device with which the wireless communication terminal wirelessly communicates.

According to yet another aspect of the present invention, provided is a wireless communication method including: wirelessly communicating with a wireless communication terminal; and controlling at least one of switching of a frequency band of the wireless communication and switching of the wireless communication terminal based on at least one of time information and peripheral information indicating a status of a peripheral object.

According to yet another aspect of the present invention, provided is a storage medium storing a program that causes a computer to perform: wirelessly communicating with a wireless communication terminal; and controlling at least one of switching of a frequency band of the wireless communication and switching of the wireless communication terminal based on at least one of time information and peripheral information indicating a status of a peripheral object.

According to yet another aspect of the present invention, provided is a wireless communication method including: wirelessly communicating with a wireless communication device; and controlling at least one of switching of a frequency band of the wireless communication and switching of the wireless communication device based on at least one of time information and peripheral information indicating a status of a peripheral object.

According to yet another aspect of the present invention, provided is a storage medium storing a program that causes a computer to perform: wirelessly communicating with a wireless communication device; and controlling at least one of switching of a frequency band of the wireless communication and switching of the wireless communication device based on at least one of time information and peripheral information indicating a status of a peripheral object.

According to yet another aspect of the present invention, provided is a wireless communication device including: a wireless communication unit capable of wirelessly communicating with a wireless communication terminal; and a communication control unit that controls switching of a frequency band of the wireless communication based on location information on the wireless communication terminal.

According to yet another aspect of the present invention, provided is a wireless communication terminal including: a wireless communication unit capable of wirelessly communicating with a wireless communication device; and a communication control unit that controls switching of a frequency band of the wireless communication based on location information on the wireless communication terminal.

According to yet another aspect of the present invention, provided is a wireless communication system including: a wireless communication terminal; a wireless communication device capable of wirelessly communicating with the wireless communication terminal; and a communication control unit that controls switching of a frequency band of the wireless communication based on location information on the wireless communication terminal.

According to yet another aspect of the present invention, provided is a wireless communication method including: wirelessly communicating with a wireless communication terminal; and controlling switching of a frequency band of the wireless communication based on location information on the wireless communication terminal.

According to yet another aspect of the present invention, provided is a storage medium storing a program that causes a computer to perform: wirelessly communicating with a wireless communication terminal; and controlling switching of a frequency band of the wireless communication based on location information on the wireless communication terminal.

According to yet another aspect of the present invention, provided is a wireless communication method performed by a wireless communication terminal, the wireless communication method including: wirelessly communicating with a wireless communication device; and controlling switching of a frequency band of the wireless communication based on location information on the wireless communication terminal.

According to yet another aspect of the present invention, provided is a storage medium storing a program that causes a computer forming a wireless communication terminal to perform: wirelessly communicating with a wireless communication device; and controlling switching of a frequency band of the wireless communication based on location information on the wireless communication terminal.

Advantageous Effects of Invention

According to the present invention, it is possible to realize reliable and stable wireless communication even in an unstable radio environment.

BRIEF DESCRIPTION OF DRAWINGS

FIG. 6A is a schematic diagram illustrating an example of time information used for prediction of a radio environment.

FIG. 6B is a schematic diagram illustrating an example of time information used for prediction of a radio environment.

FIG. 9 is a schematic diagram illustrating an example of operation information used in prediction of a radio environment.

FIG. 10 is a flowchart illustrating a prediction process of a radio environment in the wireless communication method according to the second example embodiment of the present invention.

DESCRIPTION OF EMBODIMENTS

First Example Embodiment

A wireless communication system, a wireless communication device, a wireless communication terminal, and a wireless communication method according to a first example embodiment of the present invention will be described by using FIG. 1 to FIG. 7.

Figure 1:
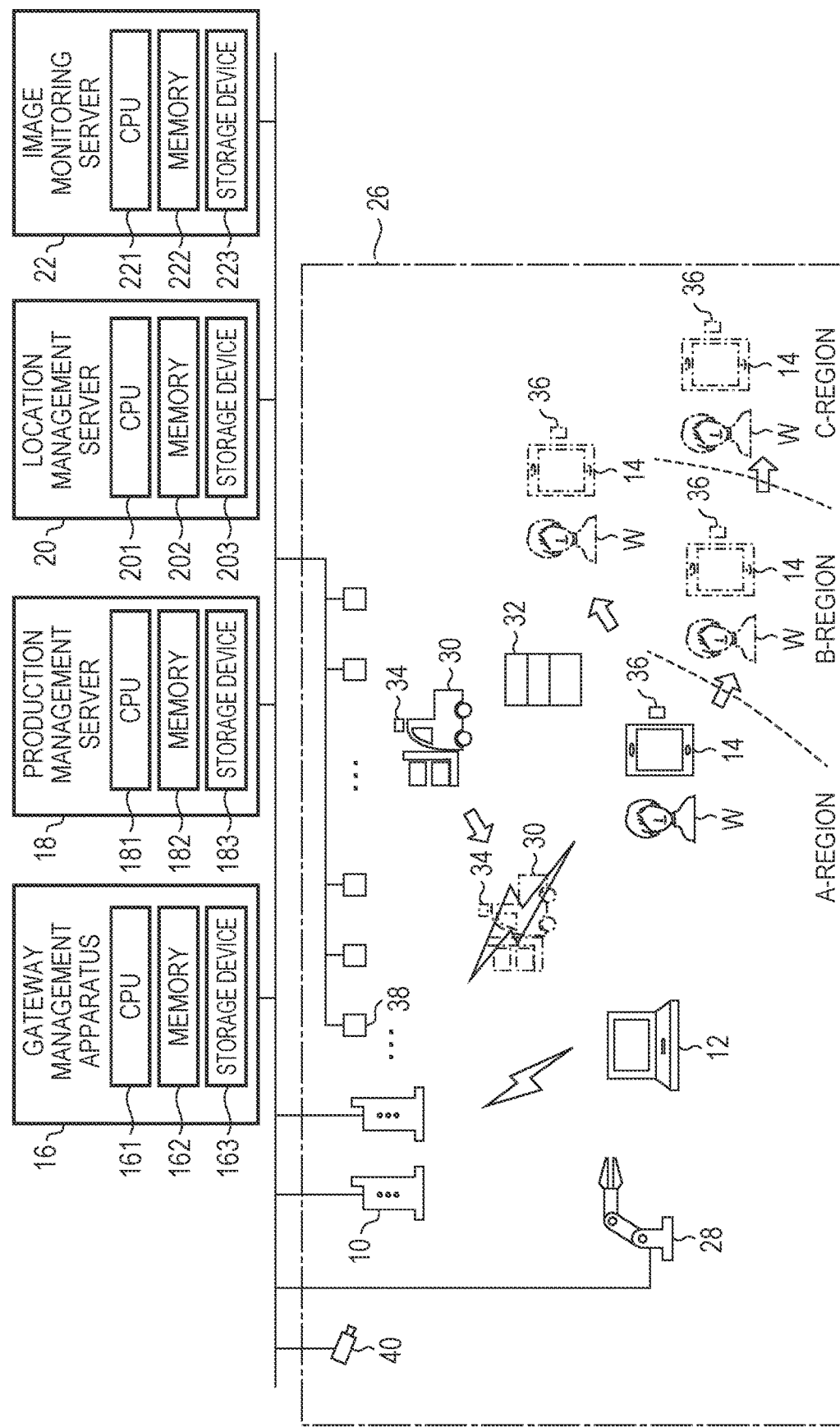
FIG. 1 is a schematic diagram illustrating a general configuration of a wireless communication system according to a first example embodiment of the present invention.
Figure 2:
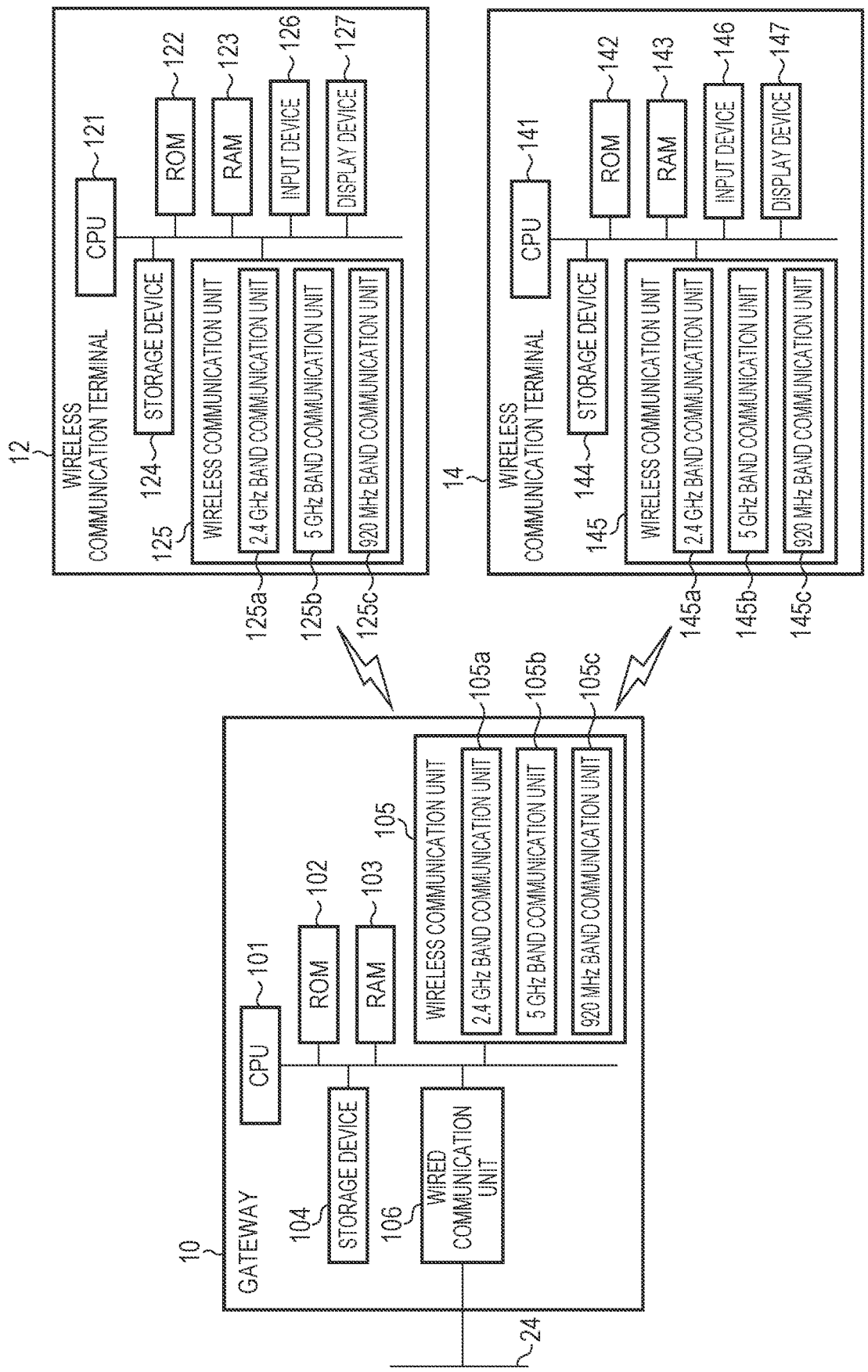
FIG. 2 is a block diagram illustrating a configuration of a gateway and a wireless communication terminal according to the first example embodiment of the present invention.
Figure 3:
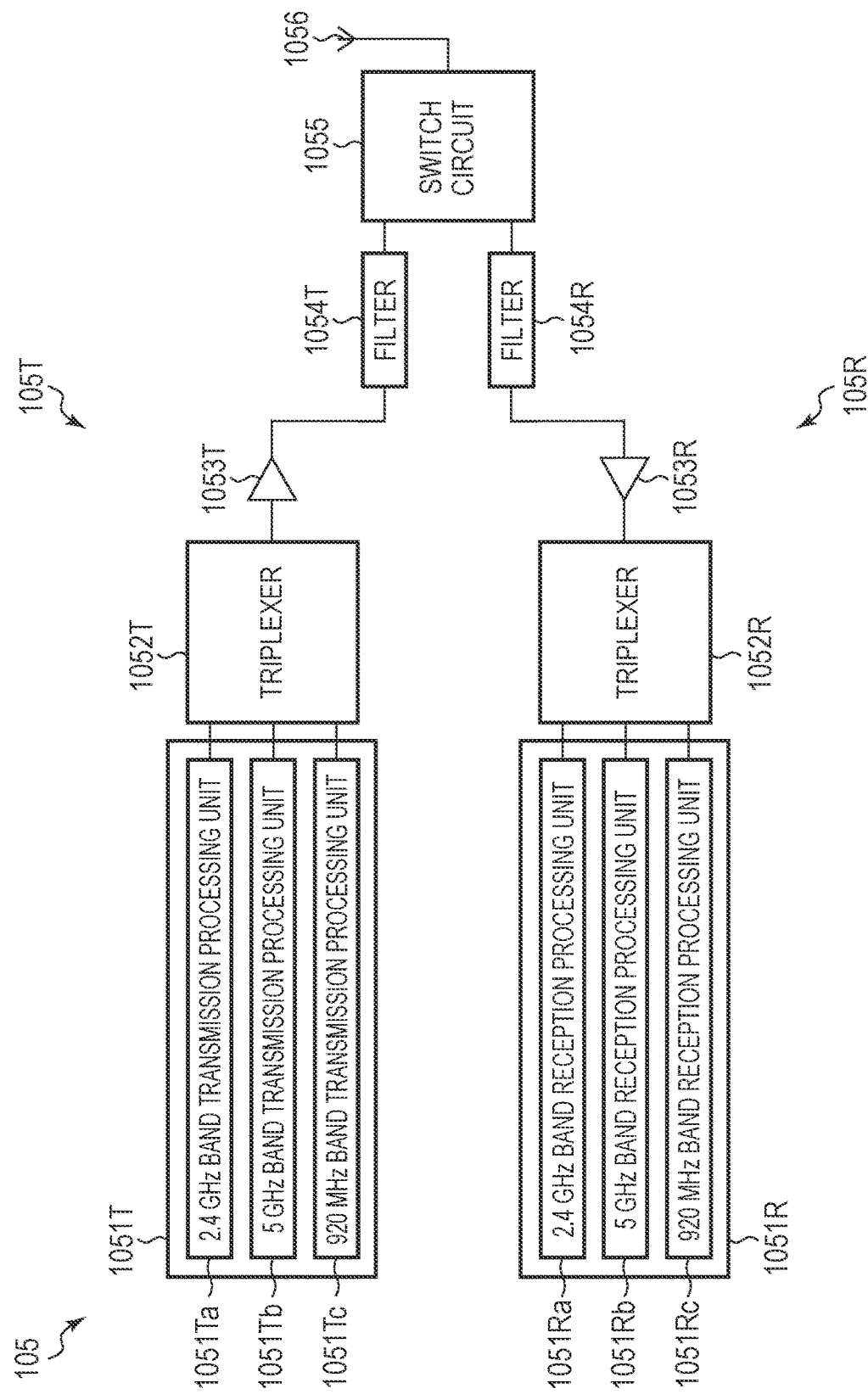
FIG. 3 is a block diagram illustrating an example of a wireless communication unit in the gateway and the wireless communication terminal according to the first example embodiment of the present invention.
Figure 4:
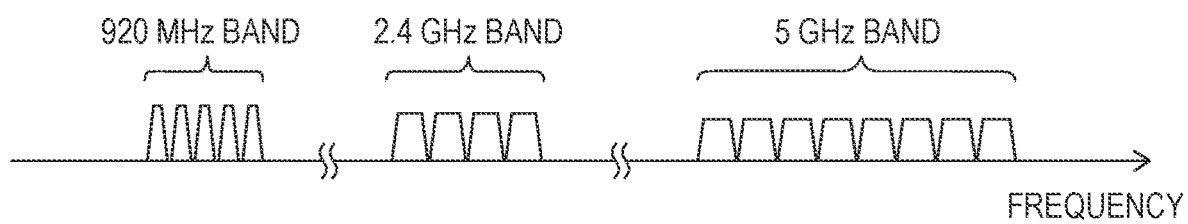
FIG. 4 is a schematic diagram illustrating an example a frequency band used in wireless communication.

First, the wireless communication system according to the present example embodiment will be described by using FIG. 1 to FIG. 4. FIG. 1 is a schematic diagram illustrating a general configuration of the wireless communication system according to the present example embodiment. FIG. 2 is a block diagram illustrating a configuration of a gateway and a wireless communication terminal according to the present example embodiment. FIG. 3 is a block diagram illustrating an example of a wireless communication unit in the gateway and the wireless communication terminal according to the present example embodiment. FIG. 4 is a schematic diagram illustrating an example a frequency band used in wireless communication.

As illustrated in FIG. 1, a wireless communication system 1 according to the present example embodiment includes gateways 10 that are wireless communication devices, wireless communication terminals 12 and 14, a gateway management apparatus 16, a production management server 18, a location management server 20, and an image monitoring server 22. The gateways 10, the gateway management apparatus 16, the production management server 18, the location management server 20, and the image monitoring server are connected to a network 24 that is a LAN, for example. Further, the wireless communication terminals 12 and 14 can connect to the network 24 by wireless communication with the gateway 10 and externally transmit and receive information via the network 24.

Each gateway 10, which is a wireless communication device, is installed inside a factory 26 that is a facility where the wireless communication terminals 12 and 14 are used. Inside the factory 26, a plurality of gateways 10 are installed. Note that the gateway 10 may be an access point.

The wireless communication terminals 12 and 14 are used inside the factory 26 in which the plurality of gateways 10 are installed. For example, the wireless communication terminal 12 is a laptop computer, a desktop computer, or the like fixed to and used in a particular indoor place of the factory 26. Further, for example, the wireless communication terminal 14 is a mobile information terminal such as a smartphone, a tablet, or the like carried and used by a worker W who works inside the factory 26.

The gateway management apparatus 16 has a central processing unit (CPU) 161, a memory 162, and a storage apparatus 163 and functions as a management device that intensively manages the plurality of gateways 10. For example, the gateway management apparatus 16 controls a parameter such as a channel used in wireless communication, a radio wave intensity, or the like on the plurality of gateways 10. Note that the gateway management apparatus 16 may be on-premises type or may be a cloud-type.

Inside the factory 26, an apparatus 28 that operates during working time of the factory 26 is installed. The apparatus 28 may be, for example, a processing machine, a processing apparatus, a transport apparatus, or the like used for production of products or the like. The apparatus 28 generates noise of a 2.4 GHz band at the operation thereof and may be a noise source to wireless communication in the 2.4 GHz band. The apparatus 28 is suspended and not operated during a rest period and a non-working period of the factory 26.

Further, the worker W carrying the wireless communication terminal 14 having a wireless communication function is located inside the factory 26 and engages in the operation during a working period of the factory 26.

The production management server 18 has a CPU 181, a memory 182, and a storage device 183 and functions as a management server of the production management system that manages production in the factory 26. The production management server 18 stores, in the storage device 183, time information regarding the working period in which the apparatus 28 is operated and the rest time in which the apparatus 28 is suspended. Further, the apparatus 28 and other apparatus installed inside the factory 26 are connected to the network 24 and transmits operation information regarding the operation status to the production management server 18 via the network 24. The production management server 18 stores, in the storage device 183, operation information regarding the operation status transmitted from the apparatus 28 and other apparatus located inside the factory 26. Note that the production management server 18 may be an on-premises type or may be a cloud type.

The location management server 20 has a CPU 201, a memory 202, and a storage device 203 and functions as a management server of an indoor positioning system in the factory 26. Inside the factory 26, for example, an indoor positioning system using a wireless signal such as Ultra Wide Band (UWB) or the like is constructed. Inside the factory 26, a mobile object that moves inside the factory 26, such as a carrier vehicle 30 that carries materials or the like, the wireless communication terminal 14 carried by the worker W, and the like, is present as targets whose locations are to be managed. Note that, inside the factory 26, fixed objects such as the material rack 32 fixed at particular indoor places of the factory 26 are also present. A wireless tag 34 that emits a radio signal used for location detection is attached to the carrier vehicle 30. Further, a wireless tag 36 used for location detection is attached also to the wireless communication terminal 14 or the worker W who carries it. On the other hand, a plurality of receivers 38 that receive a radio signal used for location detection emitted from the wireless tags 34 and 36 are provided on the ceiling or the like inside the factory 26. Each receiver 38 is connected to the network 24 and transmits data regarding received radio signal to the location management server 20 via the network 24. In the location management server 20, the CPU 201 functions as a location calculation unit and calculates and identifies the locations of the carrier vehicle 30 and the wireless communication terminal 14 from an arrival time difference, a radio wave intensity difference, or the like of a radio signal based on data transmitted from the plurality of receivers 38. The location management server 20 stores, in the storage device 203, location information regarding the locations of the carrier vehicle 30 and the wireless communication terminal 14 identified in such a way. Note that the indoor positioning system is not limited to a system using UWB. As an indoor positioning system, for example, a system using a wireless LAN iBeacon, an Indoor Messaging System (IMES), a Radio Frequency Identification (RFID) tag, or the like may be used other than the above. Note that the location management server 20 may be an on-premises type or may be a cloud type.

The image monitoring server 22 has a CPU 221, a memory 222, and a storage device 223 and functions as a management server of an image monitoring system in the factory 26. Inside the factory 26, a monitoring camera that captures the inside of the factory 26 is installed. The monitoring camera 40 is connected to the network 24 and transmits image information regarding a captured image to the image monitoring server 22 via the network 24. The image monitoring server 22 stores image information transmitted from the monitoring camera 40 in the storage device 223. Note that the image monitoring server 22 may be an on-premises type or may be a cloud type.

In such a way, the wireless communication system according to the present example embodiment is configured. The gateway 10 and the wireless communication terminals 12 and 14 that perform wireless communication in the wireless communication system 1 according to the present example embodiment will be described below.

The gateway 10 wirelessly communicates with the wireless communication terminals 12 and 14 and connects the wireless communication terminals 12 and 14 to the network 24. The gateway 10 can wirelessly communicate with the wireless communication terminals 12 and 14 in a plurality of frequency bands different from each other. Further, the gateway 10 can also wirelessly communicate with the wireless communication terminal 12 in one frequency band and with the wireless communication terminal 14 in another frequency band. For example, the gateway 10 can wirelessly communicate with the wireless communication terminal 12 in the 920 MHz band and with the wireless communication terminal 14 in the 5 GHz band. The gateway 10 can alternatively switch the frequency band used for wireless communication out of the plurality of frequency bands in accordance with the predicted indoor radio environment of the factory 26. Specifically, the gateway 10 can select the 2.4 GHz band, the 5 GHz, and the 920 MHz band, which are different frequencies from each other, as a frequency band used for wireless communication.

For example, the wireless communication with the 2.4 GHz band between the gateway 10 and the wireless communication terminals 12 and 14 conforms to IEEE 802.11g that is a wireless LAN specification defined by the Institute of Electrical and Electronics Engineers, Inc (IEEE). Further, the wireless communication with the 5 GHz band between the gateway 10 and the wireless communication terminals 12 and 14 conforms to IEEE 802.11ac that is a wireless LAN specification defined by IEEE. Further, the wireless communication with the 920 MHz band between the gateway 10 and the wireless communication terminals 12 and 14 conforms to IEEE 802.15.4g that is a wireless Personal Area Network (PAN) specification defined by IEEE. Note that the specification of the wireless LAN and the wireless PAN is not limited to the above and may be various specifications.

As illustrated in FIG. 2, the gateway 10 has a CPU 101, a read only memory (ROM) 102, a random access memory (RAM) 103, and a storage device 104. Further, the gateway 10 has a wireless communication unit 105 and a wired communication unit 106. The wireless communication unit has a 2.4 GHz band communication unit 105a, a 5 GHz band communication unit 105b, and a 920 MHz band communication unit 105c.

The CPU 101 operates in accordance with a program stored in the ROM 102, the storage device 104, or the like and functions as a control unit that controls the entire operation of the gateway 10. The RAM 103 provides a memory field required for the operation of the CPU 101. In particular, the CPU 101 performs processing as respective units described below.

First, the CPU 101 functions as a prediction unit that predicts an indoor radio environment of the factory 26 based on at least one of time information and peripheral information indicating the status of a peripheral object. The time information is information regarding planed time of the factory 26 such as the working period of the factory 26 or the like, for example. Further, the peripheral information indicating the status of a peripheral object may be, for example, operation information regarding the operation status of the apparatus 28, location information on a moving unit such as the carrier vehicle 30 or the like, image information obtained by capturing the inside of the factory 26, or the like.

Further, the CPU 101 functions as an information acquisition unit that acquires the information described above used for prediction of the radio environment via the network 24. More specifically, the CPU 101 acquires information regarding the planned time of the factory 26, such as the working period of the factory 26 or operation information regarding the operation status of the apparatus 28 from the production management server 18 via the network 24. Further, the CPU 101 acquires location information on a moving unit such as the carrier vehicle 30 from the location management server 20 via the network 24. Further, the CPU 101 acquires, from the image monitoring server 22 via the network 24, image information obtained by capturing the inside of the factory 26. The CPU 101 stores various information acquired in such a way in the storage device 104 and uses the stored various information for prediction of the radio environment.

The storage device 104 stores a database in which a relationship between information used for prediction of the radio environment described above and a predicted radio environment is recorded. This database may be created based on a rule acquired empirically from the actual operation of the factory 26 or may be created based on environment survey using a spectrum analyzer or the like. The CPU 101 as the prediction unit can predict a radio environment based on such a database. The CPU 101 can predict which frequency band of the plurality of frequency bands available for wireless communication is a suitable radio environment, that is, which frequency band of wireless communication allows the highest reliability and stability to be obtained, for example, as prediction of a radio environment.

Furthermore, the CPU 101 functions as a communication control unit that controls switching of the frequency band of wireless communication performed with respect to the wireless communication terminals 12 and 14 based on the result of the above prediction of the radio environment. The CPU 101 switches the wireless communication unit that wirelessly communicates with the wireless communication terminals 12 and 14 between the 2.4 GHz band communication unit 105a, the 5 GHz band communication unit 105b, and the 920 MHz band communication unit 105c. This enables the CPU 101 to switch the frequency band of wireless communication performed with respect to the wireless communication terminals 12 and 14.

The wireless communication unit 105 wirelessly communicates with the wireless communication terminals 12 and 14 under the control of the CPU 101. The 2.4 GHz band communication unit 105a, the 5 GHz band communication unit 105b, and the 920 MHz band communication unit 105c can wirelessly communicate with the wireless communication terminals 12 and 14 in frequency bands of the 2.4 GHz band, the 5 GHz band, and the 920 MHz band, respectively.

The wired communication unit 106 is connected to the network 24 by a wire and transmits and receives information via the network 24 under the control of the CPU 101.

In such a way, the gateway 10 that is a wireless communication device that can wirelessly communicate with the wireless communication terminals 12 and 14 is configured.

On the other hand, the wireless communication terminal 12 wirelessly communicates with the gateway 10 and connects to the network 24 via the gateway 10. The wireless communication terminal 12 can externally transmit and receive information via the network 24. The wireless communication terminal 12 can wirelessly communicate with the gateway 10 in a plurality of frequency bands in association with a plurality of frequency bands used by the gateway 10 for the wireless communication. The wireless communication terminal 12 alternatively switches the frequency band used for wireless communication in response to switching of the frequency band of wireless communication by the gateway 10. Specifically, the wireless communication terminal 12 selects the 2.4 GHz band, the 5 GHz band, and 920 MHz band as the frequency band used for wireless communication in response to switching of the 2.4 GHz band, the 5 GHz band, and 920 MHz band by the gateway 10.

As illustrated FIG. 2, the wireless communication terminal 12 has a CPU 121, a ROM 122, a RAM 123, a storage device 124, a wireless communication unit 125, an input device 126, and a display device 127. The wireless communication unit 125 has a 2.4 GHz band communication unit 125a, a 5 GHz band communication unit 125b, and a 920 MHz band communication unit 125c.

The CPU 121 operates in accordance with a program stored in the ROM 122, the storage device 124, or the like and functions as a control unit that controls the entire operation of the wireless communication terminal 12. The RAM 123 provides a memory field required for the operation of the CPU 121. In particular, the CPU 121 performs processing as a communication control unit described below.

The CPU 121 functions as a communication control unit that controls switching of the frequency band of wireless communication with respect to the gateway 10 in response to switching of the frequency band of wireless communication by the gateway 10. The CPU 121 switches the wireless communication unit that wirelessly communicates with the gateway 10 among the 2.4 GHz band communication unit 125a, the 5 GHz band communication unit 125b, and the 920 MHz band communication unit 125c. This enables the CPU 121 to switch the frequency band of wireless communication performed with respect to the gateway 10.

The wireless communication unit 125 wirelessly communicates with the gateway 10 under the control of the CPU 121. The 2.4 GHz band communication unit 125a, the 5 GHz band communication unit 125b, and the 920 MHz band communication unit 125c can wirelessly communicate with the gateway 10 in frequency bands of the 2.4 GHz band, the 5 GHz band, and the 920 MHz band, respectively.

The input device 126 is used for inputting information, an instruction, or the like to the wireless communication terminal 12. While not particularly limited, the input device 126 is a keyboard, a pointing device, or the like. Further, the input device 126 may be a touchscreen embedded in the display device 127.

The display device 127 is used for displaying output from the wireless communication terminal 12. While not particularly limited, the display device 127 may be, for example, a liquid crystal display, an organic electroluminescence (EL) display, or the like.

In such a way, the wireless communication terminal 12 that can wirelessly communicate with the gateway 10 is configured.

The wireless communication terminal 14 has the same configuration as the wireless communication terminal 12 described above. As illustrated in FIG. 2, the wireless communication terminal 14 has a CPU 141, a ROM 142, a RAM 143, a storage device 144, a wireless communication unit 145, an input device 146, and a display device 147. The wireless communication unit 145 has a 2.4 GHz band communication unit 145a, a 5 GHz band communication unit 145b, and a 920 MHz band communication unit 145c. The CPU 141, the ROM 142, the RAM 143, and the storage device 144 of the wireless communication terminal 14 correspond to the CPU 121, the ROM 122, the RAM 123, and the storage device 124 of the wireless communication terminal 12, respectively. The wireless communication unit 145, the input device 146, and the display device 147 of the wireless communication terminal 14 correspond to the wireless communication unit 125, the input device 126, and the display device 127 of the wireless communication terminal 12, respectively. The 2.4 GHz band communication unit 145a, the 5 GHz band communication unit 145b, and the 920 MHz band communication unit 145c of the wireless communication terminal 14 correspond to the 2.4 GHz band communication unit 125a, the 5 GHz band communication unit 125b, and the 920 MHz band communication unit 125c of the wireless communication terminal 12, respectively.

FIG. 3 illustrates an example of a more specific configuration of the wireless communication unit 105 in the gateway 10. Note that the wireless communication units 125 and 145 of the wireless communication terminals 12 and 14 may have the same configuration. Further, the configuration of the wireless communication units 105, 125, and 145 is not particularly limited but may be various configuration. For example, each of the wireless communication units 105, 125, and 145 may be formed of an independent communication module for each of the plurality of frequency bands.

As illustrated in FIG. 3, the wireless communication unit 105 has, as a transmitter unit 105T that performs a transmission process, a transmission processing unit 1051T, a triplexer 1052T, a wideband power amplifier 1053T, a filter 1054T, a switch circuit 1055, and an antenna 1056. The transmission processing unit 1051T has a 2.4 GHz band-transmission processing unit 1051Ta, a 5 GHz band-transmission processing unit 1051Tb, and a 920 MHz band-transmission processing unit 1051Tc that perform transmission processes in respective frequency bands.

Further, the wireless communication unit 105 has, as a receiver unit 105R that performs a reception process, an antenna 1056, a switch circuit 1055, a filter 1054R, a wideband low noise amplifier 1053R, a triplexer 1052R, and a reception process unit 1051R. The reception processing unit 1051R has a 2.4 GHz band-reception processing unit 1051Ra, a 5 GHz band-reception processing unit 1051Rb, and a 920 MHz band-reception processing unit 1051Rc that perform reception processes in respective frequency bands.

The switch circuit 1055 connects the filter 1054T to the antenna 1056 during a transmission process. The transmission processing unit 1051T uses any one of the 2.4 GHz band-transmission processing unit 1051Ta, the 5 GHz band-transmission processing unit 1051Tb, and the 920 MHz band-transmission processing unit 1051Tc to generate a transmission signal of a frequency band in accordance with each of the above at a transmission process. The triplexer 1052T supplies the transmission signal generated by the transmission processing unit 1051T to the wideband power amplifier 1053T. The wideband power amplifier 1053T amplifies the supplied transmission signal. A transmission signal amplified by the wideband power amplifier 1053T is externally transmitted through the filter 1054T and then via the antenna 1056.

The switch circuit 1055 connects the filter 1054R to the antenna 1056 during a reception process. During the reception process, in response to receiving an external signal, the antenna 1056 supplies the received signal to the wideband low noise amplifier 1053R via the filter 1054R. The wideband low noise amplifier 1053R amplifies and supplies the supplied received signal to the triplexer 1052R. The triplexer 1052R supplies the supplied received signal to any one of the 2.4 GHz band-reception processing unit 1051Ra, the 5 GHz band-reception processing unit 1051Rb, and the 920 MHz band-reception processing unit 1051Rc of the reception processing unit 1051R in accordance with the frequency band of the supplied received signal. The reception processing unit 1051R generates a received data from the received signal in any one of the 2.4 GHz band-reception processing unit 1051Ra, the GHz band-reception processing unit 1051Rb, and the 920 MHz band-reception processing unit 1051Rc.

FIG. 4 is a schematic diagram illustrating an example of a frequency band used for wireless communication and illustrates the 920 MHz band, the 2.4 GHz band, and the 5 GHz band on the horizontal axis representing frequency. A plurality of channels, the number of which depends on the frequency band, are reserved in each frequency band of the 920 MHz band, the 2.4 GHz band, and the 5 GHz band, and any one of the channels is used for wireless communication.

In the wireless communication system 1 according to the present example embodiment, one gateway 10 of the plurality of gateways 10 controls switching of the frequency band for wireless communication with respect to the wireless communication terminal 12 based on time information regarding the working period of the factory 26 acquired from the production management server 18. This enables the wireless communication system 1 according to the present example embodiment to suppress interference with wireless communication and realize reliable and stable wireless communication between the gateway 10 and the wireless communication terminal 12.

Figure 5:
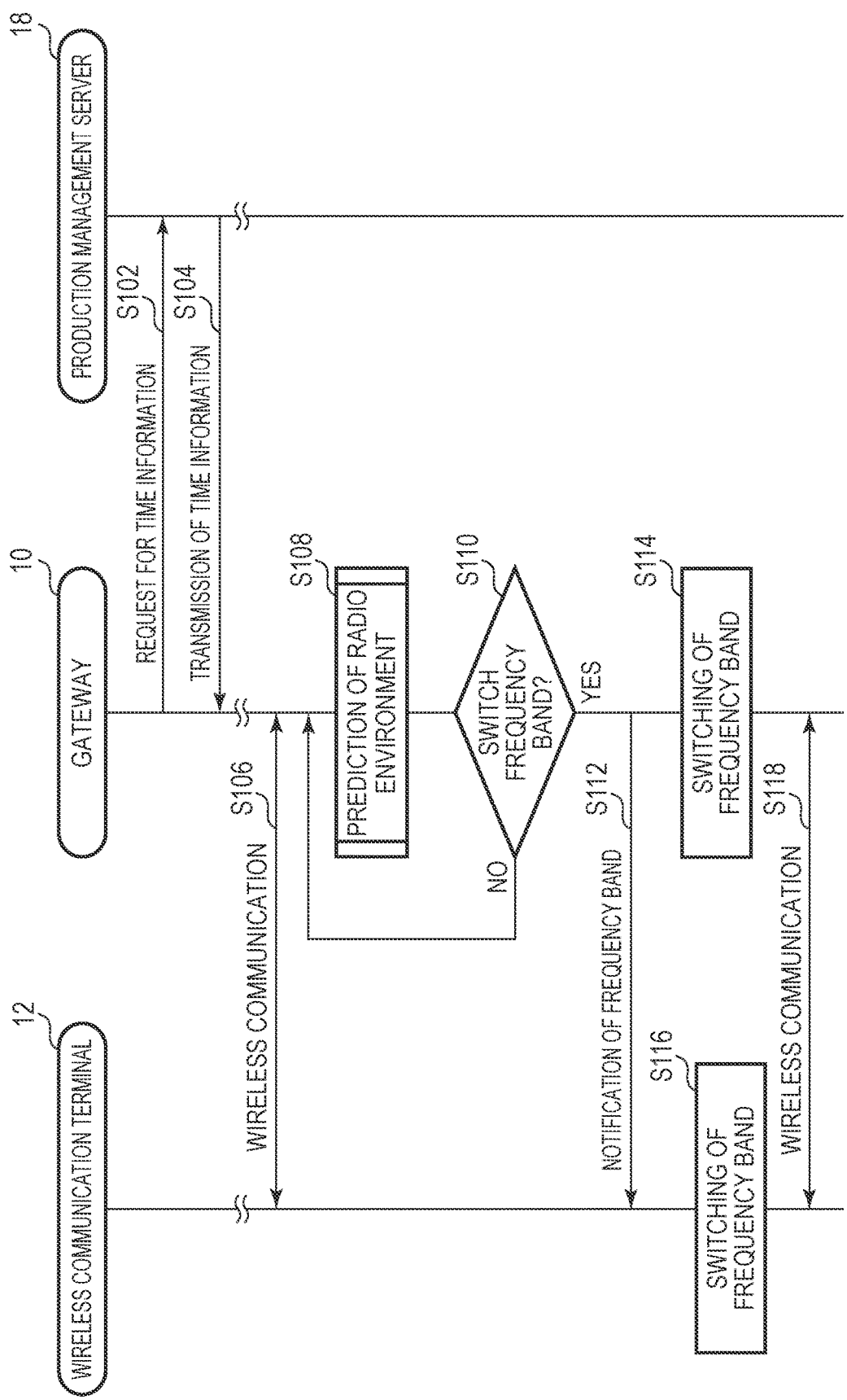
FIG. 5 is a sequence diagram illustrating a wireless communication method according to the first example embodiment of the present invention.
Figure 7:
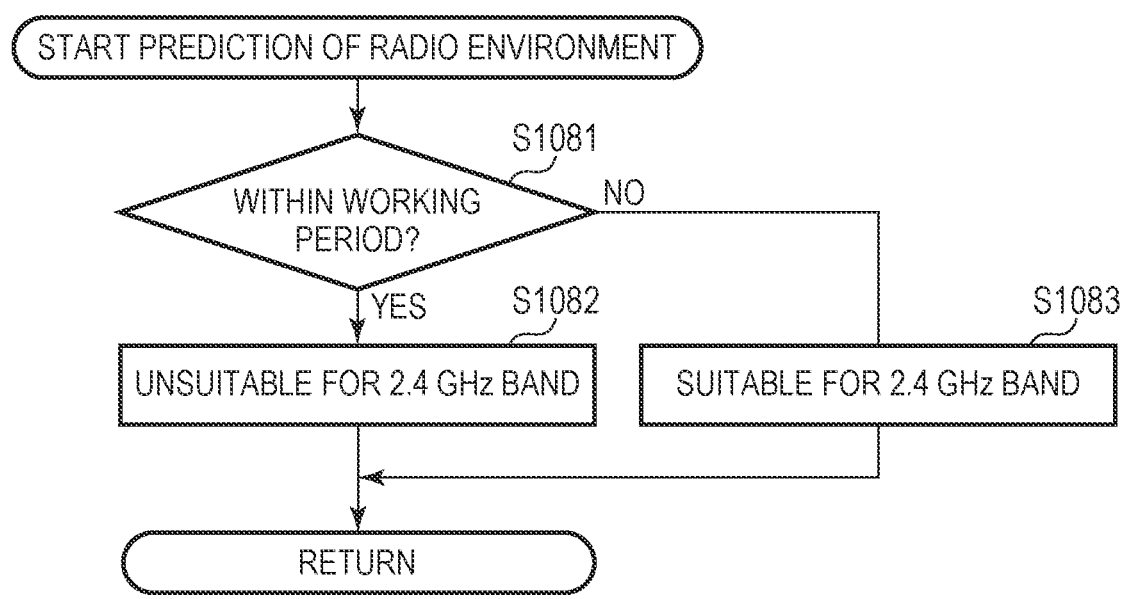
FIG. 7 is a flowchart illustrating a prediction process of a radio environment in the wireless communication method according to the first example embodiment of the present invention.

A wireless communication method using the wireless communication system 1 according to the present example embodiment will be further described below by using FIG. 5 to FIG. 7. FIG. 5 is a sequence diagram illustrating the wireless communication method according to the present example embodiment. FIG. 6A and FIG. 6B are schematic diagrams illustrating examples of time information used for prediction of a radio environment. FIG. 7 is a flowchart illustrating a prediction process of a radio environment in the wireless communication method according to the present example embodiment. Note that, in the present example embodiment, a case of performing control to switch the frequency band between the 2.4 GHz band and the 920 MHz band for wireless communication between one gateway 10 of the plurality of gateways 10 and the wireless communication terminal 12 will be described.

First, as illustrated in FIG. 5, in the gateway 10, the CPU 101 requests time information regarding the working period of the factory 26 from the production management server 18 via the network 24 (step S102). In response to the request for time information by the gateway 10, the production management server 18 transmits time information regarding the working period of the factory 26 to the gateway 10 (step S104). In the gateway 10, the CPU 101 receives the time information regarding the working period transmitted from the production management server 18 and stores the received time information in the storage device 104.

In such a way, in the gateway 10, the CPU 101 functions as an information acquisition unit and acquires in advance time information regarding the working period of the factory 26 from the production management server 18 via the network 24. Note that the CPU 101 can acquire time information regarding the working period regularly or irregularly and update time information regarding the working period.

FIG. 6A illustrates an example of time information regarding the working period of the factory 26 acquired from the production management server 18 by the CPU 101 of the gateway 10. As illustrated in FIG. 6A, the production management server 18 has time information indicating that the working periods of the factory 26 are "9:00 to 12:00" and "13:00 to 17:00", and the period of "12:00 to 13:00" therebetween is a rest period, for example. The gateway 10 acquires such time information regarding the working period from the production management server 18 via the network 24.

Note that the production management server 18 may have time information indicating a planned operation period for each apparatus installed in the factory 26. FIG. 6B illustrates an example of time information indicating the planned operation period for each apparatus installed inside the factory 26 for each date. As illustrated in FIG. 6B, the production management server 18 may have time information indicating the planned operation period for each date for each of the plurality of apparatus N1, apparatus N2, apparatus N3, . . . installed inside the factory 26, for example. The gateway 10 may acquire such time information regarding planned operation periods of apparatuses installed inside the factory 26 from the production management server 18 via the network 24.

The wireless communication terminal 12 establishes and performs wireless communication with the gateway 10 in any one frequency band of the 2.4 GHz band and the 920 MHz band in accordance with a specification of wireless communication (step S106). In the wireless communication terminal 12, the CPU 121 functions as the communication control unit and controls any one of the 2.4 GHz band communication unit 125a and the 920 MHz band communication unit 125c. Thereby, the CPU 121 wirelessly communications with the gateway 10 in a frequency band in accordance with the communication unit to be controlled. On the other hand, in the gateway 10, the CPU 101 functions as the communication control unit and controls any one of the 2.4 GHz band communication unit 105a and the 920 MHz band communication unit 105c. Thereby, the CPU 101 wirelessly communicates with the wireless communication terminal 12 at a frequency band requested by the wireless communication terminal 12.

In the gateway 10 that has established wireless communication with the wireless communication terminal 12, the CPU 101 functions as the prediction unit and predicts the indoor radio environment of the factory 26 based on time information regarding the working period of the factory 26 illustrated in FIG. 6A (step S108).

In a prediction process of the radio environment, as illustrated in FIG. 7, the CPU 101 references time information regarding the working period acquired from the production management server 18 and determines whether or not the current time is within the working period of the factory 26 (step S1081). Note that the CPU 101 functions as a time acquisition unit that acquires the current time and, for example, can acquire information regarding the current time set in the gateway 10 and use the acquired information in the determination in step S1081. Further, the CPU 101 that functions as the time acquisition unit can also acquire time information regarding the current time from the external server such as the production management server 18, a network time protocol (NTP) server, or the like and use the acquired time information in the determination in step S1081, for example.

Inside the factory 26 during the working period, the apparatus 28 that generates noise of the 2.4 GHz band is operated. Such the apparatus 28 may be a noise source to wireless communication in the 2.4 GHz band. Further, during the working period, the worker W carrying the wireless communication terminal 14 enters the factory 26 and works therein. The wireless communication terminal 14 may perform wireless communication in the 2.4 GHz band and thus may be another noise source to wireless communication in the 2.4 GHz band.

Therefore, the indoor radio environment of the factory 26 during the working period is predicted to be a radio environment that is unsuitable for the 2.4 GHz band. In contrast, noise sources to wireless communication in the 920 MHz band are fewer than that in the 2.4 GHz band inside the factory 26 during the working period. Thus, the indoor radio environment of the factory 26 during the working period is predicted to be a suitable radio environment for the 920 MHz band.

On the other hand, during the rest period and the non-working period of the factory 26, since the apparatus 28 is suspended and the worker W carrying the wireless communication terminal 14 leaves the inside of the factory 26, noise sources to wireless communication in the 2.4 GHz band are reduced compared to the time during the working period. Thus, the radio environment of the factory 26 during the rest period and the non-working period is predicted to be a suitable radio environment for the 2.4 GHz band.

In such a way, there is a certain relationship between time information regarding the working period of the factory 26 as illustrated in FIG. 6A and a radio environment predicted from this time information. A database that records such a relationship between time information and a predicted radio environment is stored in the storage device 104 of the gateway 10. In the gateway 10, the CPU 101 that functions as the prediction unit references the databased stored in the storage device 104 and predicts the indoor radio environment of the factory 26. Note that the database used in prediction of the radio environment is not necessarily required to be stored in the storage device 104 of the gateway 10 and may be stored in an external apparatus such as the gateway management apparatus 16, the production management server 18, or the like.

If the current time is within the working period (step S1081, YES), the CPU 101 of the gateway 10 predicts that the indoor radio environment of the factory 26 is an unsuitable radio environment for the 2.4 GHz band (step S1082).

On the other hand, if the current time is not within the working period (step S1081, NO), the CPU 101 of the gateway 10 predicts that the indoor radio environment of the factory 26 is a suitable radio environment for the 2.4 GHz band (step S1083).

Note that there may be a certain relationship also between time information regarding a planned operation period for each apparatus installed inside the factory 26 as illustrated in FIG. 6B and a radio environment predicted from this time information. That is, determination whether or not the predicted radio environment is suitable for the 2.4 GHz band may change in accordance with whether or not it is within a planned operation period of a particular apparatus. It is therefore also possible to predict the indoor radio environment of the factory 26 based on time information regarding the planned operation period for each apparatus in addition to time information regarding the working period described above or based on time information regarding the planned operation period for each apparatus instead of time information regarding the working period described above.

Next, in the gateway 10, the CPU 101 functions as the communication control unit and determines whether or not to switch the frequency band of wireless communication with the wireless communication terminal based on the prediction result of the radio environment obtained in step S108 described above (step S110).

First, if the CPU 101 predicts that the radio environment is unsuitable for the 2.4 GHz band (step S1082) and when the current frequency band of wireless communication with the wireless communication terminal is the 2.4 GHz band, the CPU 101 determines to switch the frequency band (step S110, YES). That is, the CPU 101 determines to switch the frequency band of wireless communication with the wireless communication terminal 12 from the 2.4 GHz band to the 920 MHz band.

On the other hand, if the CPU 101 predicts that the radio environment is unsuitable for the 2.4 GHz band (step S1082) and when the current frequency band of wireless communication with the wireless communication terminal 12 is the 920 MHz band, the CPU 101 determines not to switch the frequency band (step S110, NO). In this case, the CPU 101 proceeds to step S108 and regularly or irregularly performs prediction of the radio environment of step S108.

Further, if the CPU 101 predicts that the radio environment is suitable for the 2.4 GHz band (step S1083) and when the current frequency band of wireless communication with the wireless communication terminal is the 920 MHz band, the CPU 101 determines to switch the frequency band (step S110, YES). That is, the CPU 101 determines to switch the frequency band of wireless communication with the wireless communication terminal 12 from the 920 MHz band to the 2.4 GHz band.

On the other hand, if the CPU 101 predicts that the radio environment is suitable for the 2.4 GHz band (step S1083) and when the current frequency band of wireless communication with the wireless communication terminal 12 is the 2.4 GHz band, the CPU 101 determines not to switch the frequency band (step S110, NO). In this case, the CPU 101 proceeds to step S108 and regularly or irregularly performs prediction of the radio environment of step S108.

As described above, if it is determined to switch the frequency band of wireless communication (step S110, YES), the CPU 101 of the gateway 10 notifies the wireless communication terminal 12 of the switched new frequency band by using the currently established wireless communication (step S112).

Next, in the gateway 10, the CPU 101 functions as the communication control unit and controls the wireless communication unit 105. Thereby, the CPU 101 switches the frequency band used for wireless communication with the wireless communication terminal 12 to a new frequency band (step S114).

Further, in the wireless communication terminal 12, the CPU 121 functions as the communication control unit and controls the wireless communication unit 125. Thereby, the CPU 121 switches the frequency band used for wireless communication with the gateway 10 to a new frequency band notified from the gateway 10 (step S116).

Next, the gateway 10 and the wireless communication terminal 12 establish and perform wireless communication therebetween in the switched new frequency band in accordance with a specification of wireless communication (step S118). Here, the CPU 101 of the gateway 10 functions as the communication control unit. That is, the CPU 101 controls the communication unit corresponding to the switched new frequency band of the 2.4 GHz band communication unit 105a and the 920 MHz band communication unit 105c and wirelessly communicates with the wireless communication terminal 12. Further, the CPU 121 of the wireless communication terminal 12 functions as the communication control unit. That is, the CPU 121 controls the communication unit corresponding to the switched new frequency band of the 2.4 GHz band communication unit 125a and the 920 MHz band communication unit 125c and wirelessly communicates with the gateway 10.

As described above, in the wireless communication system 1 according to the present example embodiment, the frequency band used in wireless communication between the gateway 10 and the wireless communication terminal 12 is switched between the 2.4 GHz band and the 920 MHz band based on time information regarding the working period of the factory 26. That is, the 920 MHz band is used during the working period of the factory 26, and the 2.4 GHz band is used during the rest period and the non-working period of the factory 26. In such a way, in the present example embodiment, since wireless communication between the gateway 10 and the wireless communication terminal 12 is performed in the frequency band in accordance with the time zone in the factory 26, it is possible to suppress interference with the wireless communication to realize reliable and stable wireless communication.

For example, during the working period of the factory 26, signals, such as a control command, which have no problem in low rate wireless communication can be transmitted and received in the 920 MHz band where fewer noise sources are present inside the factory 26 than in the 2.4 GHz band. On the other hand, during the rest period and the non-working period of the factory 26, massive signals such as log data accumulated in the wireless communication terminal 12 can be transmitted and received in the 2.4 GHz band which allows higher rate wireless communication than in the 920 MHz band. In such a way, the type of signals to be transmitted or received with priority may be set in advance for each frequency band to be used in wireless communication. By changing the type of signals transmitted or received in wireless communication in accordance with the frequency band to be used in wireless communication, it is possible to transmit or received a signal at a higher efficiency.

In such a way, according to the present example embodiment, since switching of the frequency band to be used in wireless communication between the gateway 10 and the wireless communication terminal 12 is controlled based on time information regarding the working period, interference with wireless communication can be suppressed. Therefore, according to the present example embodiment, it is possible to realize reliable and stable wireless communication even in an unstable radio environment such as the indoor of the factory 26.

Second Example Embodiment

Figure 8:
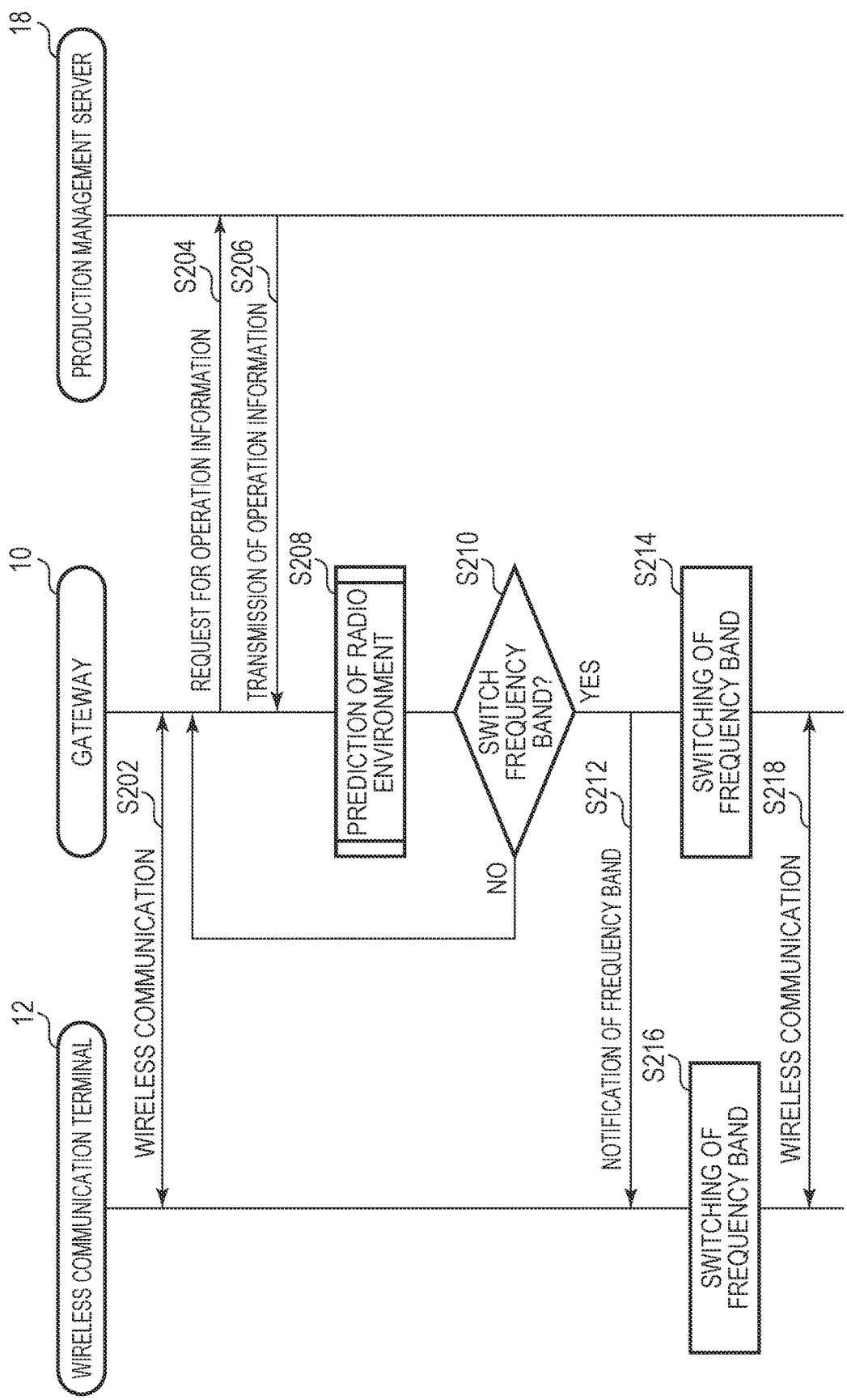
FIG. 8 is a sequence diagram illustrating a wireless communication method according to a second example embodiment of the present invention.

A wireless communication system, a wireless communication device, a wireless communication terminal, and a wireless communication method according to a second example embodiment of the present invention will be described by using FIG. 1, FIG. 2, FIG. 8, to FIG. 10. FIG. 8 is a sequence diagram illustrating a wireless communication method according to the present example embodiment. FIG. 9 is a schematic diagram illustrating an example of operation information used in prediction of a radio environment. FIG. 10 is a flowchart illustrating a prediction process of a radio environment in the wireless communication method according to the present example embodiment. Note that similar components to those of the wireless communication system, the wireless communication device, the wireless communication terminal, and the wireless communication method according to the first example embodiment described above will be labeled with the same references, and the description thereof will be omitted or simplified.

In the present example embodiment, in the wireless communication system 1 illustrated in FIG. 1, a case where switching of the frequency band used in wireless communication between the gateway 10 and the wireless communication terminal 12 is controlled based on operation information regarding the operation status of an apparatus installed inside the factory 26 will be described. Note that, also in the present example embodiment, a case of performing control to switch the frequency band between the 2.4 GHz band and the 920 MHz band for wireless communication between one gateway 10 of the plurality of gateways 10 and the wireless communication terminal 12 will be described.

As illustrated in FIG. 8, the wireless communication terminal 12 establishes and performs wireless communication with the gateway 10 in any one frequency band of the 2.4 GHz band and the 920 MHz band in accordance with a specification of wireless communication in the same manner as in the first example embodiment (step S202).

In the gateway 10 that has established wireless communication with the wireless communication terminal 12, the CPU 101 requests operation information regarding the operation status of an apparatus installed inside the factory 26 from the production management server 18 via the network 24 (step S204). The operation information regarding the operation status of the apparatus is peripheral information indicating the status of an apparatus that is a peripheral object located around the gateway 10 and the wireless communication terminals 12 and 14.

For example, the apparatus 28 installed inside the factory 26 is connected to the network 24 and configured to transmit operation information regarding the operation status as to whether or not the apparatus is in operation or in suspension to the production management server 18 via the network 24. The production management server 18 stores, in the storage device 183, and has operation information transmitted from the apparatus 28 and other apparatus installed inside the factory 26 as discussed above.

FIG. 9 illustrates an example of operation information included in the production management server 18. The production management server 18 has operation information regarding the operation status as to whether or not each of the plurality of apparatus N1, apparatus N2, apparatus N3, . . . installed inside the factory 26 is in operation or in suspension.

Note that operation information regarding the operation status of an apparatus installed inside the factory 26 is not limited to information transmitted from the apparatus as described above. In addition, it is possible to acquire operation information based on image information associated with the operation status of an apparatus. In such a case, for example, a display lamp that indicates whether an apparatus is in operation or in suspension with colors different from each other such as green, red, or the like is installed inside the factory 26. It is possible to capture such a display lamp by using the monitoring camera 40 and acquire operation information regarding the operation status of the apparatus based on image information on the captured display lamp.

In response to the request for the operation information by the gateway 10, the production management server 18 transmits operation information regarding the operation status of an apparatus installed inside the factory 26 to the gateway 10 (step S206). In the gateway 10, the CPU 101 receives operation information regarding the operation status of the apparatus transmitted from the production management server 18 and stores the received operation information in the storage device 104.

In such a way, in the gateway 10, the CPU 101 functions as an information acquisition unit and acquires operation information regarding the operation status of an apparatus installed inside the factory 26 from the production management server 18 via the network 24. Note that the CPU 101 can acquire operation information regarding the operation status of an apparatus regularly or irregularly or in real time and update the operation information regarding the operation status.

Next, in the gateway 10, the CPU 101 functions as the prediction unit and predicts the indoor radio environment of the factory 26 based on operation information regarding the operation status of an apparatus installed inside the factory 26 (step S208).

In a prediction process of the radio environment, as illustrated in FIG. 10, the CPU 101 references the operation information regarding the operation status of the apparatus acquired from the production management server 18 to determine whether or not an apparatus which generates noise of the 2.4 GHz band is in operation (step S2081).

An apparatus which generates noise of the 2.4 GHz band may be a noise source to wireless communication in the 2.4 GHz band if the apparatus is in operation. Thus, when the apparatus which generates noise of the 2.4 GHz band is in operation, it is predicted that the indoor radio environment of the factory 26 is an unsuitable radio environment for the 2.4 GHz band. On the other hand, when the apparatus which generates noise of the 2.4 GHz band is in suspension, it is predicted that the indoor radio environment of the factory 26 is a suitable radio environment for the 2.4 GHz band.

In such a way, there is a certain relationship between operation information regarding the operation status of an apparatus installed inside the factory 26 and a radio environment predicted from this operation information. A database that records such a relationship between operation information and a predicted radio environment is stored in the storage device 104 of the gateway 10. In the gateway 10, the CPU 101 that functions as the prediction unit references the databased and predicts the indoor radio environment of the factory 26. Note that the database used in prediction of the radio environment is not necessarily required to be stored in the storage device 104 of the gateway 10 and may be stored in an external apparatus such as the gateway management apparatus 16, the production management server 18, or the like.

If the apparatus which generates noise of the 2.4 GHz band is in operation (step S2081, YES), the CPU 101 of the gateway 10 predicts that the indoor radio environment of the factory 26 is an unsuitable radio environment for the 2.4 GHz band (step S2082).

On the other hand, if the apparatus which generates noise of the 2.4 GHz band is not in operation (step S2081, NO), the CPU 101 of the gateway 10 predicts that the indoor radio environment of the factory 26 is a suitable radio environment for the 2.4 GHz band (step S2083).

Note that, in prediction of a radio environment, the CPU 101 can consider not only the presence or absence of the apparatus which generates nose of the 2.4 GHz band but also the number of such apparatuses in operation or the like. For example, the CPU 101 may predict that the indoor radio environment of the factory 26 is an unsuitable radio environment for the 2.4 GHz band only if the number of apparatuses in operation which generate noise of the 2.4 GHz band is above a predetermined number.

Next, in the gateway 10, the CPU 101 functions as the communication control unit and determines whether or not to switch the frequency band of wireless communication with the wireless communication terminal based on a prediction result of the radio environment obtained in step S208 described above (step S210).

Step S210 is the same as step S110 of the first example embodiment. Note that, if the CPU 101 determines not to switch the frequency band of wireless communication with the wireless communication terminal (step S210, NO), the CPU 101 proceeds to step S204. The CPU 101 then regularly or irregularly performs request for operation information in step S204 and prediction of the radio environment in step S208.

After step S210, step S212 of notification of a new frequency band, steps S214 and S216 of switching the frequency band, and step S218 of establishing wireless communication and performing the wireless communication are performed. These steps S212, S214, S216, and S218 are the same as steps S112, S114, S116, and S118 of the first example embodiment, respectively. Thus, the description of steps S210, S212, S214, S216, and S218 will be omitted.

In such a way, according to the present example embodiment, since switching of the frequency band to be used in wireless communication between the gateway 10 and the wireless communication terminal 12 is controlled based on operation information regarding the operation status of an apparatus, interference with wireless communication can be suppressed. Therefore, according to the present example embodiment, it is possible to realize reliable and stable wireless communication even in an unstable radio environment such as the indoor of the factory 26.

Note that, also in the present example embodiment, the gateway 10 can be further configured to predict the radio environment based on time information regarding the working period and control switching of the frequency band of wireless communication in the same manner as in the first example embodiment.

Third Example Embodiment

Figure 11:
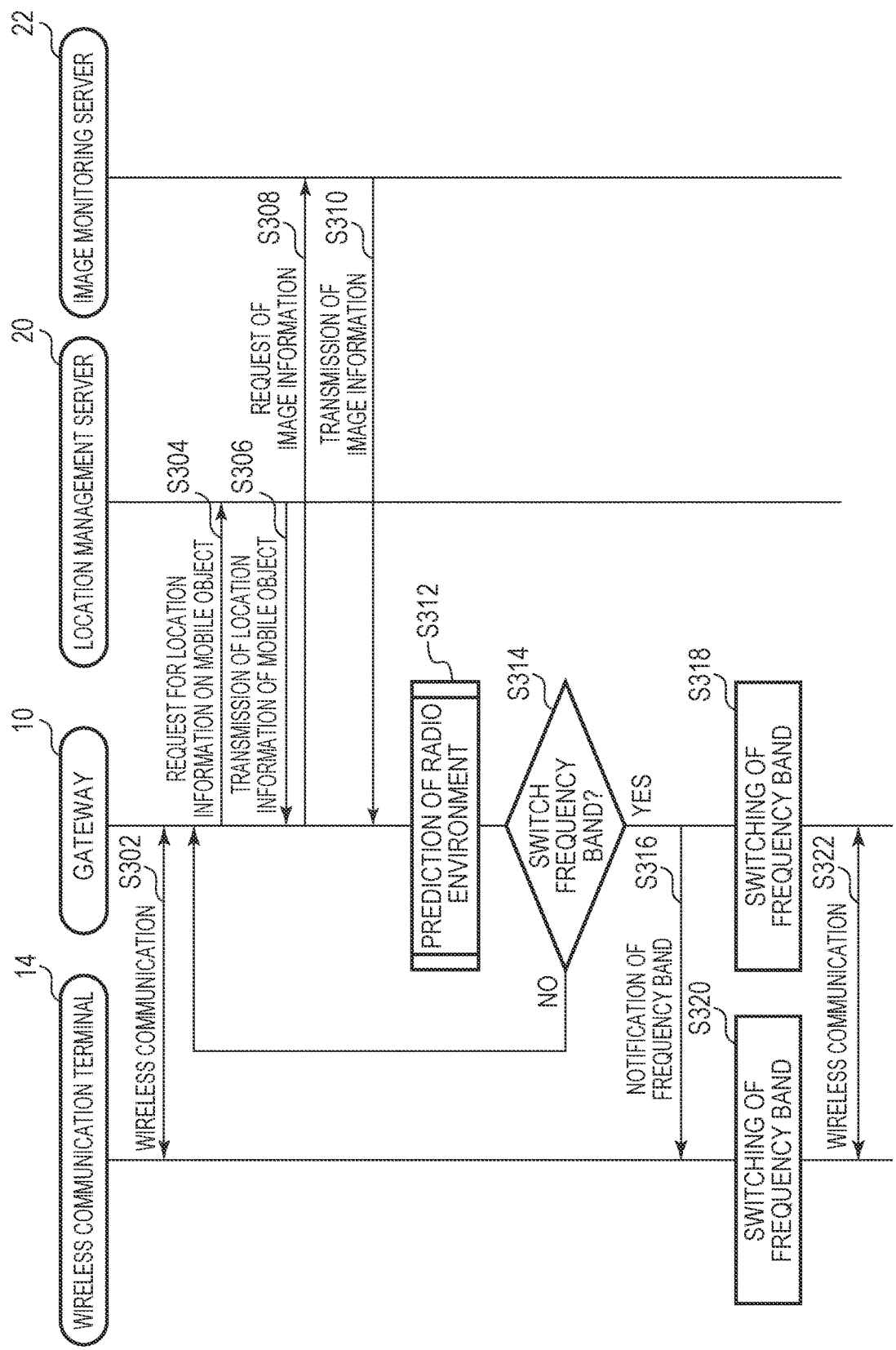
FIG. 11 is a sequence diagram illustrating a wireless communication method according to a third example embodiment of the present invention.
Figure 12:
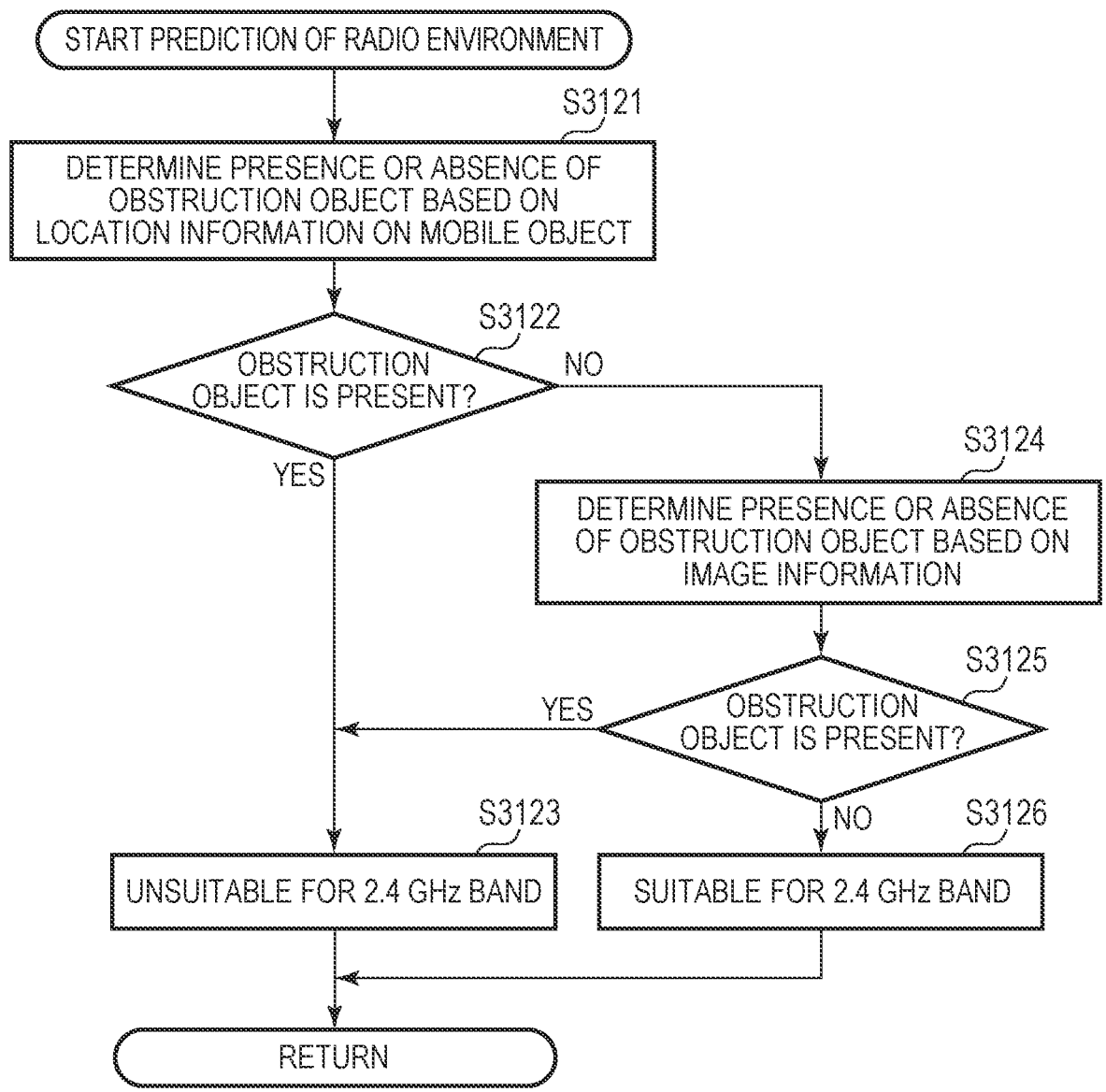
FIG. 12 is a flowchart illustrating a prediction process of a radio environment in the wireless communication method according to the third example embodiment of the present invention.

A wireless communication system, a wireless communication device, a wireless communication terminal, and a wireless communication method according to a third example embodiment of the present invention will be described by using FIG. 1, FIG. 2, FIG. 11, and FIG. 12. FIG. 11 is a sequence diagram illustrating a wireless communication method according to the present example embodiment. FIG. 12 is a flowchart illustrating a prediction process of a radio environment in the wireless communication method according to the present example embodiment. Note that similar components to those of the wireless communication system, the wireless communication device, the wireless communication terminal, and the wireless communication method according to the first and second example embodiments described above will be labeled with the same references, and the description thereof will be omitted or simplified.

In the present example embodiment, in the wireless communication system 1 described above and illustrated in FIG. 1, a case where switching of the frequency band used in wireless communication is controlled based on location information on a mobile object such as a carrier vehicle 30 and image information obtained by capturing the inside of the factory 26 will be described. Note that, in the present example embodiment, as a device that wirelessly communicates with the gateway 10, the wireless communication terminal 14 carried by the worker W instead of the wireless communication terminal 12 fixed inside the factory 26 will be described. Further, also in the present example embodiment, a case of performing control to switch the frequency band between the 2.4 GHz band and the 920 MHz band for wireless communication between one gateway 10 of the plurality of gateways 10 and the wireless communication terminal 14 will be described.

As illustrated in FIG. 1, a mobile object such as the carrier vehicle 30 that transports materials or the like moves if necessary and changes the location thereof inside the factory 26. Further, the worker W also moves if necessary in accordance with the task or the like and changes the location thereof. As the worker W moves, the wireless communication terminal 14 carried by that worker W also moves and changes the location thereof.

As illustrated in FIG. 11, the wireless communication terminal 14 carried by the worker W establishes and performs wireless communication with the gateway 10 in any one frequency band of the 2.4 GHz band and the 920 MHz band in accordance with a specification of wireless communication (step S302). In the wireless communication terminal 14, the CPU 141 functions as the communication control unit and controls any one of the 2.4 GHz band communication unit 145a and the 920 MHz band communication unit 145c. Thereby, the CPU 141 wirelessly communicates with the gateway 10 in the frequency band in accordance with the communication unit to be controlled. On the other hand, in the gateway 10, the CPU 101 functions as the communication control unit and controls any one of the 2.4 GHz band communication unit 105a and the 920 MHz band communication unit 105c. Thereby, the CPU 101 wirelessly communicates with the wireless communication terminal 14 in the frequency band requested by the wireless communication terminal 14.

In the gateway 10 that has established wireless communication with the wireless communication terminal 14, the CPU 101 requests location information on a mobile object such as the carrier vehicle 30, the wireless communication terminal 14, or the like from the location management server 20 via the network 24 (step S304). Location information on a mobile object such as the carrier vehicle 30 is information regarding a mobile object that is an object inside the factory 26, which is peripheral information indicating the status of a mobile object that is a peripheral object located around the gateway 10 and the wireless communication terminals 12 and 14.

As described above, the location management server 20 stores, in the storage device 203, and has location information on a mobile object such as the carrier vehicle 30, the wireless communication terminal 14, or the like obtained by an indoor positioning system using a radio signal of the UWB or the like. In response to receiving a request for location information from the gateway 10, the location management server 20 transmits location information on a mobile object such as the carrier vehicle 30, the wireless communication terminal 14, or the like inside the factory 26 to the gateway 10 (step S306). In the gateway 10, the CPU 101 receives location information on the mobile object transmitted from the location management server 20 and stores the received location information in the storage device 104.

Further, in the gateway 10 that has established communication with the wireless communication terminal 14, the CPU 101 requests image information obtained by capturing the inside of the factory 26 from the image monitoring server 22 via the network 24 (step S308). Image information obtained by capturing the inside of the factory 26 is peripheral information indicating the status of a peripheral object such as the carrier vehicle 30, the material rack 32, or the like located around the gateway 10 and the wireless communication terminals 12 and 14. The image information obtained by capturing the inside of the factory 26 includes image information obtained by capturing a peripheral object such as the carrier vehicle 30, the material rack 32, or the like.

As described above, the image monitoring server stores, in the storage device 223, and has indoor image information on the factory 26 captured by the monitoring camera 40 installed inside the factory 26. In response to request for image information received from the gateway 10, the image monitoring server 22 transmits image information obtained by capturing the inside of the factory 26 to the gateway 10 (step S310). In the gateway 10, the CPU 101 receives image information obtained by capturing the inside the factory 26 transmitted from the image monitoring server and stores the received image information in the storage device 104.

As discussed above, in the gateway 10, the CPU 101 functions as the information acquisition unit and acquires location information on the carrier vehicle 30, the wireless communication terminal 14, or the like from the location management server 20 via the network 24. Further, the CPU 101 acquires, from the image monitoring server 22 via the network 24, image information obtained by capturing the inside of the factory 26. Note that the CPU 101 can acquire location information on a mobile object and image information obtained by capturing the inside of the factory 26 regularly or irregularly or in real time and update the location information and the image information.

Next, in the gateway 10, the CPU 101 functions as the prediction unit and predicts the indoor radio environment of the factory 26 based on location information on a mobile object such as the carrier vehicle 30, the wireless communication terminal 14, or the like and image information obtained by capturing the inside of the factory 26 (step S312). Note that the prediction of the radio environment may be performed based on any one of the location information on a mobile object and the image information obtained by capturing the inside of the factory 26.

In a prediction process of the radio environment, as illustrated in FIG. 12, the CPU 101 determines whether or not an obstruction object is present between the gateway 10 and the wireless communication terminal in wireless communication based on location information on a mobile object such as the carrier vehicle 30 (step S3121). Location information regarding an installation location of the gateway 10 is stored in the storage device 104 of the gateway 10, for example. Further, location information on a mobile object such as the carrier vehicle 30 is acquired from the location management server 20 and stored in the storage device 104 as described above. Further, location information on the wireless communication terminal 14 of interest which wirelessly communicates with the gateway 10 is also acquired from the location management server 20 as described above and stored in the storage device 104. The CPU 101 can use the location information to determine whether or not an obstruction object is present between the gateway 10 and the wireless communication terminal 14 in wireless communication.

A mobile object such as the carrier vehicle 30 moves inside the factory 26. Such a mobile object may be located between the gateway 10 and the wireless communication terminal 14 in wireless communication and may be an obstruction object for the wireless communication.

In comparison between a radio wave of the 2.4 GHz band and a radio wave of the 920 MHz band, the radio wave of the 920 MHz band is superior to the radio wave of the 2.4 GHz band in a diffraction property and thus in diffraction characteristics. Thus, when an obstruction object is present between the gateway 10 and the wireless communication terminal 14, it is predicted that the indoor radio environment of the factory 26 is an unsuitable radio environment for the 2.4 GHz band. On the other hand, when no such obstruction object is present, it is predicted that the indoor radio environment of the factory 26 is a suitable radio environment for the 2.4 GHz band.

In such a way, there is a certain relationship between the presence or absence of an obstruction object, that is, location information on a mobile object such as the carrier vehicle 30, the wireless communication terminal 14, or the like and a radio environment predicted from this location information. A database that records such a relationship between location information on a mobile object and a predicted radio environment is stored in the storage device 104 of the gateway 10. In the gateway 10, the CPU 101 that functions as the prediction unit references the databased and predicts the indoor radio environment of the factory 26. Note that the database used in prediction of the radio environment is not necessarily required to be stored in the storage device 104 of the gateway 10 and may be stored in an external apparatus such as the gateway management apparatus 16, the production management server 18, or the like.

If an obstruction object is present (step S3122, YES), the CPU 101 of the gateway 10 predicts that the indoor radio environment of the factory 26 is an unsuitable radio environment for the 2.4 GHz band (step S3123).

On the other hand, if no obstruction object is present (step S3122, NO), the CPU 101 of the gateway 10 further determines based on image information whether or not an obstruction object is present (step S3124). That is, based on image information obtained by capturing the inside of the factory 26, the CPU 101 determines whether or not an obstruction object is present between the gateway 10 and the wireless communication terminal 14 in wireless communication.

When the worker W carrying the wireless communication terminal 14 moves inside the factory 26, the gateway 10 and the wireless communication terminal in wireless communication may be obstructed from each other by a fixed object such as the material rack 32. In such a way, a fixed object inside the factory may be located between the gateway 10 and the wireless communication terminal 14 in wireless communication and may be an obstruction object for the wireless communication.

The CPU 101 of the gateway 10 performs an image recognition process on image information obtained by capturing the inside of the factory 26 and thereby determines whether or not an obstruction object is present between the gateway 10 and the wireless communication terminal 14 in wireless communication. Note that an image recognition process on image information obtained by capturing the inside of the factory 26 is not necessarily required to be performed in the gateway 10 and may be performed in an external apparatus such as the image monitoring server 22. In such a case, the CPU 101 of the gateway 10 receives, from the external apparatus via the network 24, a result of an image recognition process performed by the external apparatus, for example.

If an obstruction object is present (step S3125, YES), the CPU 101 of the gateway 10 predicts that the indoor radio environment of the factory 26 is an unsuitable radio environment for the 2.4 GHz band (step S3123).

On the other hand, if no obstruction object is present (step S3125, NO), the CPU 101 of the gateway 10 predicts that the indoor radio environment of the factory 26 is a suitable radio environment for the 2.4 GHz band (step S3126).

Next, in the gateway 10, the CPU 101 functions as the communication control unit and determines whether or not to switch the frequency band of wireless communication with the wireless communication terminal based on the prediction result of the radio environment obtained in step S312 described above (step S314).

First, if the CPU 101 predicts that the radio environment is unsuitable for the 2.4 GHz band (step S3123) and when the current frequency band of wireless communication with the wireless communication terminal is the 2.4 GHz band, the CPU 101 determines to switch the frequency band (step S314, YES). That is, the CPU 101 determines to switch the frequency band of wireless communication with the wireless communication terminal 14 from the 2.4 GHz band to the 920 MHz band.

On the other hand, if the CPU 101 predicts that the radio environment is unsuitable for the 2.4 GHz band (step S3123) and when the current frequency band of wireless communication with the wireless communication terminal 14 is the 920 MHz band, the CPU 101 determines not to switch the frequency band (step S314, NO). In this case, the CPU 101 proceeds to step S304 and regularly or irregularly performs request for location information on a mobile object of step S304, request for image information of step S308, and prediction of the radio environment of step S312.

Further, if the CPU 101 predicts that the radio environment is suitable for the 2.4 GHz band (step S3126) and when the current frequency band of wireless communication with the wireless communication terminal is the 920 MHz band, the CPU 101 determines to switch the frequency band (step S314, YES). That is, the CPU 101 determines to switch the frequency band of wireless communication with the wireless communication terminal 14 from the 920 MHz band to the 2.4 GHz band.

On the other hand, if the CPU 101 predicts that the radio environment is suitable for the 2.4 GHz band (step S3126) and when the current frequency band of wireless communication with the wireless communication terminal 14 is the 2.4 GHz band, the CPU 101 determines not to switch the frequency band (step S314, NO). In this case, the CPU 101 proceeds to step S304 and regularly or irregularly performs request for location information on a mobile object of step S304, request for image information of step S308, and prediction of the radio environment of step S312.

As described above, if it is determined to switch the frequency band of wireless communication (step S314, YES), the CPU 101 of the gateway 10 notifies the wireless communication terminal 14 of the switched new frequency band by using the currently established wireless communication (step S316).

Next, in the gateway 10, the CPU 101 functions as the communication control unit and controls the wireless communication unit 105. Thereby, the CPU 101 switches the frequency band used for wireless communication with the wireless communication terminal 14 to a new frequency band (step S318).

Further, in the wireless communication terminal 14, the CPU 141 functions as the communication control unit and controls the wireless communication unit 145. Thereby, the CPU 141 switches the frequency band used for wireless communication with the gateway 10 to a new frequency band notified from the gateway 10 (step S320).

Next, the gateway 10 and the wireless communication terminal 14 establish and perform wireless communication therebetween in the switched new frequency band in accordance with a specification of wireless communication (step S322). Here, the CPU 101 of the gateway 10 functions as the communication control unit. That is, the CPU 101 controls the communication unit corresponding to the switched new frequency band of the 2.4 GHz band communication unit 105a and the 920 MHz band communication unit 105c and wirelessly communicates with the wireless communication terminal 14. Further, the CPU 141 of the wireless communication terminal 14 functions as the communication control unit. That is, the CPU 141 controls the communication unit corresponding to the switched new frequency band of the 2.4 GHz band communication unit 145a and the 920 MHz band communication unit 145c and wirelessly communicates with the gateway 10.

In such a way, according to the present example embodiment, since switching of the frequency band to be used in wireless communication between the gateway 10 and the wireless communication terminal 14 is controlled based on location information on a mobile object and image information obtained by capturing the inside of the factory 26, obstruction of wireless communication can be suppressed. Therefore, according to the present example embodiment, it is possible to realize reliable and stable wireless communication even in an unstable radio environment such as the indoor of the factory 26.

Note that, while the case where switching of the frequency band is controlled based on both the location information on a mobile object and the image information obtained by capturing the inside of the factory 26 has been described above, the invention is not limited thereto. Switching of the frequency band can be controlled based on any one of the location information and the image information.

Further, also in the present example embodiment, the gateway 10 can be further configured to predict the radio environment based on time information regarding the working period and control switching of the frequency band of wireless communication in the same manner as in the first example embodiment.

Further, also in the present example embodiment, the gateway 10 can be further configured to predict the radio environment based on operation information on an apparatus and control switching of the frequency band of wireless communication in the same manner as in the second example embodiment.

Fourth Example Embodiment

Figure 13:
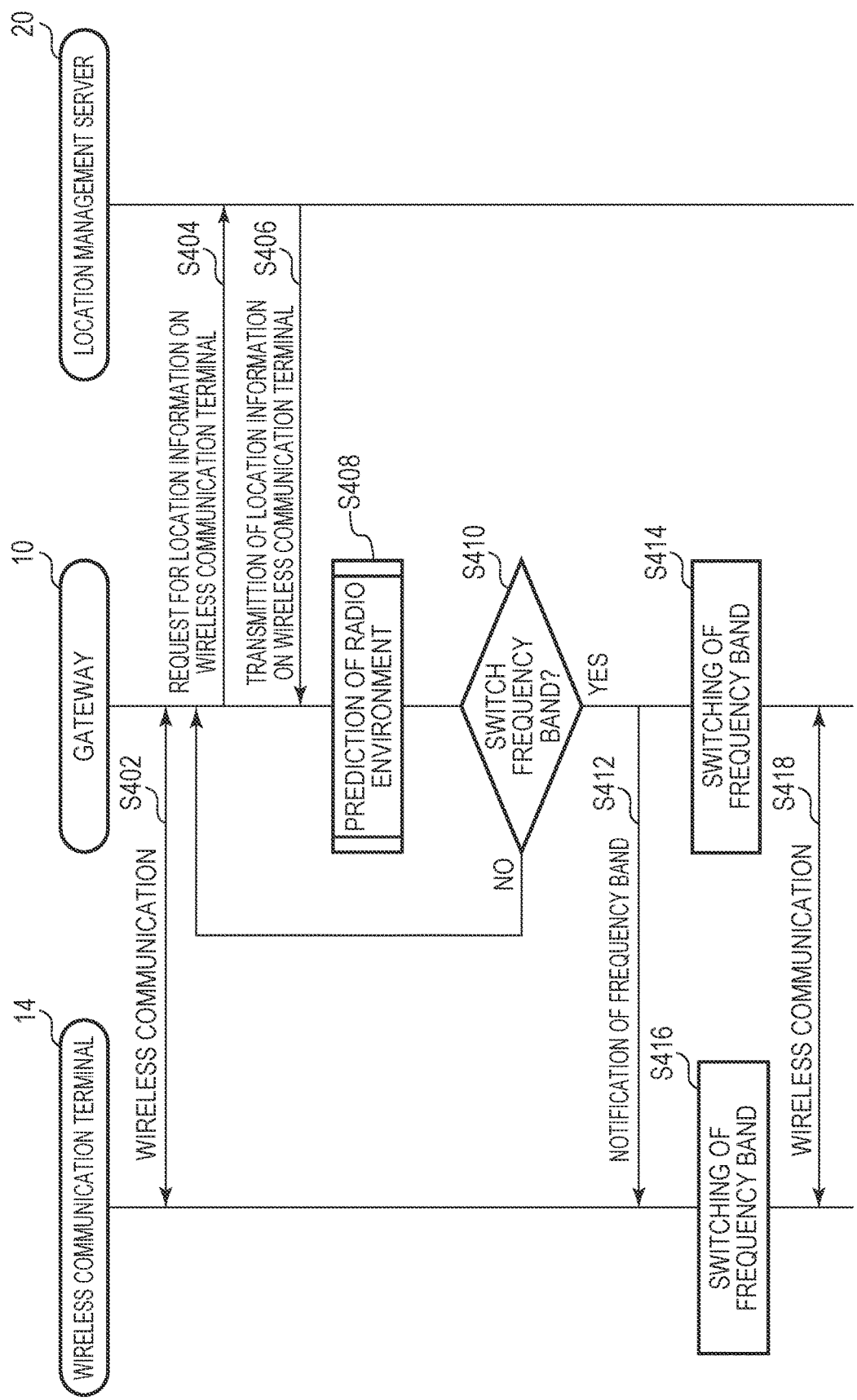
FIG. 13 is a sequence diagram illustrating a wireless communication method according to a fourth example embodiment of the present invention.
Figure 14:
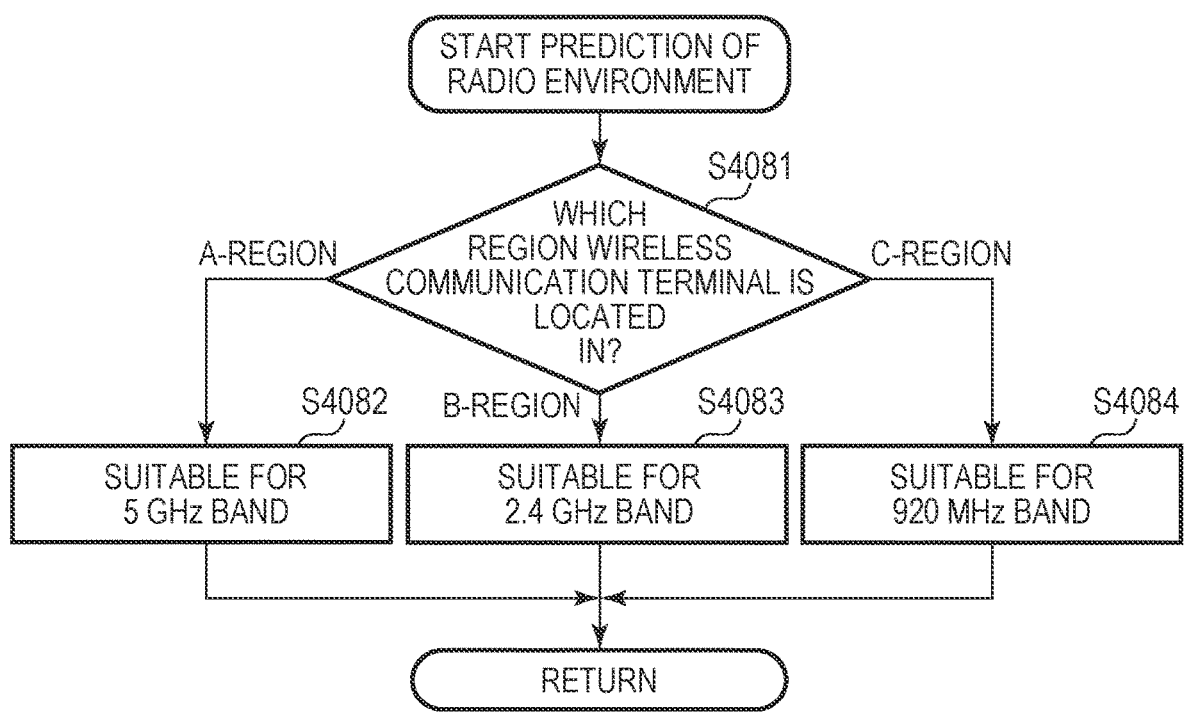
FIG. 14 is a flowchart illustrating a prediction process of a radio environment in the wireless communication method according to the fourth example embodiment of the present invention.

A wireless communication system, a wireless communication device, a wireless communication terminal, and a wireless communication method according to a fourth example embodiment of the present invention will be described by using FIG. 1, FIG. 2, FIG. 13, and FIG. 14. FIG. 13 is a sequence diagram illustrating a wireless communication method according to the present example embodiment. FIG. 14 is a flowchart illustrating a prediction process of a radio environment in the wireless communication method according to the present example embodiment. Note that similar components to those of the wireless communication system, the wireless communication device, the wireless communication terminal, and the wireless communication method according to the first to third example embodiments described above will be labeled with the same references, and the description thereof will be omitted or simplified.

In the present example embodiment, in the wireless communication system 1 described above and illustrated in FIG. 1, a case where switching of the frequency band used in wireless communication is controlled based on location information on the wireless communication terminal 14 that wirelessly communicates with the gateway 10 will be described. In the present example embodiment, as a device that wirelessly communicates with the gateway 10, the wireless communication terminal 14 carried by the worker W instead of the wireless communication terminal fixed inside the factory 26 will be described. Further, in the present example embodiment, a case of performing control to switch the frequency band between the 2.4 GHz band, the 5 GHz band, and the 920 MHz band for wireless communication between one gateway 10 of the plurality of gateways 10 and the wireless communication terminal 14 will be described.

As illustrated in FIG. 1, inside the factory 26, the worker W moves if necessary in accordance with the task or the like and changes the location thereof. As the worker W moves, the wireless communication terminal 14 carried by that worker W also moves and changes the location thereof.

As illustrated in FIG. 13, the wireless communication terminal 14 carried by the worker W establishes and performs wireless communication with the gateway 10 in any one frequency band of the 2.4 GHz band, 5 GHz band, and the 920 MHz band in accordance with a specification of wireless communication (step S402). In the wireless communication terminal 14, the CPU 141 functions as the communication control unit and controls any one of the 2.4 GHz band communication unit 145a, the 5 GHz band communication unit 145b, and the 920 MHz band communication unit 145c. Thereby, the CPU 141 wirelessly communicates with the gateway 10 in the frequency band in accordance with the control unit to be controlled. On the other hand, in the gateway 10, the CPU 101 functions as the communication control unit and controls any one of the 2.4 GHz band communication unit 105a, the 5 GHz band communication unit 105b, and the 920 MHz band communication unit 105c. Thereby, the CPU 101 wirelessly communicates with the wireless communication terminal 14 in the frequency band requested by the wireless communication terminal 14.

In the gateway 10 that has established wireless communication with the wireless communication terminal 14, the CPU 101 requests location information on the wireless communication terminal 14 from the location management server 20 via the network 24 (step S404).

The location management server 20 stores, in the storage device 203, and has location information on the wireless communication terminal 14 obtained by an indoor positioning system using a radio signal of the UWB or the like as described above. In response to receiving a request for location information from the gateway 10, the location management server 20 transmits location information on a mobile object such as the carrier vehicle 30, the wireless communication terminal 14, or the like inside the factory 26 to the gateway 10 (step S406). In the gateway 10, the CPU 101 receives location information on the mobile object transmitted from the location management server 20 and stores the received location information in the storage device 104.

As discussed above, in the gateway 10, the CPU 101 functions as the information acquisition unit and acquires location information on the wireless communication terminal 14 from the location management server 20 via the network 24. Note that the CPU 101 can acquire location information on the wireless communication terminal 14 regularly or irregularly or in real time and update the location information. Further, the CPU 101 can temporally accumulate location information on the wireless communication terminal 14 and acquire time-series data of the location information on the wireless communication terminal 14.

Next, in the gateway 10, the CPU 101 functions as the prediction unit and predicts the indoor radio environment of the factory 26 based on location information on the wireless communication terminal 14 (step S408).

In a prediction process of the radio environment, as illustrated in FIG. 14, the CPU 101 determines which region the wireless communication terminal 14 is located in based on the location information on the wireless communication terminal 14 (step S4081). The inside of the factory 26 is classified into an A-region that is the closest to the gateway 10 that performs wireless communication, a B-region that is farther from the gateway 10 than the A-region, and a C-region that is farther from the gateway 10 than the B-region, for example. The CPU 101 determines which region of the A-region, the B-region, and the C-region the wireless communication terminal 14 is located in based on the location information on the wireless communication terminal 14.

The radio waves in the 2.4 GHz band, the 5 GHz band, and the 920 MHz band are different from each other in interference immunity, transparency, a reachable distance, a diffractive property, or the like. Thus, prediction as to which frequency band of the 2.4 GHz band, the 5 GHz band, and the 920 MHz band the radio environment is suitable for may be different in accordance with which region of the A-region, the B-region, and the C-region the wireless communication terminal 14 is located in.

For example, when the wireless communication terminal 14 is located within the A-region, it is predicted that, out of the 2.4 GHz band, the 5 GHz band, and the 920 MHz band, the radio environment is suitable for the 5 GHz band that is superior to the 2.4 GHz band in interference immunity and enables higher rate communication compared to the 920 MHz band. Further, when the wireless communication terminal 14 is located within the B-region, it is predicted that, out of the 2.4 GHz band, the 5 GHz band, and the 920 MHz band, the radio environment is suitable for the 2.4 GHz band that is superior to the 5 GHz band in transparency and enables higher rate communication compared to the 920 MHz band. Further, when the wireless communication terminal 14 is located within the C-region, it is predicted that, out of the 2.4 GHz band, the 5 GHz band, and the 920 MHz band, the radio environment is suitable for the 920 MHz band that is superior to the 2.4 GHz band and the 5 GHz band in a reachable distance and a diffractive property.

In such a way, there is a certain relationship between a region in which the wireless communication terminal 14 is located, that is, location information on the wireless communication terminal 14 and a radio environment predicted from this location information. A database that records such a relationship between location information on the wireless communication terminal 14 and a predicted radio environment is stored in the storage device 104 of the gateway 10. In the gateway 10, the CPU 101 that functions as the prediction unit references the databased and predicts the indoor radio environment of the factory 26. Note that the database used in prediction of the radio environment is not necessarily required to be stored in the storage device 104 of the gateway 10 and may be stored in an external apparatus such as the gateway management apparatus 16, the production management server 18, or the like.

Further, it is possible to analyze the traffic line of the wireless communication terminal 14 inside the factory 26 by using not only simple location information on the wireless communication terminal 14 but also time-series data of the location information on the wireless communication terminal 14 and predict the radio environment based on a result of the traffic line analysis. The CPU 101 can perform traffic line analysis in the gateway 10. Note that the traffic line analysis is not necessarily required to be performed in the gateway 10 and may be performed in an external apparatus such as the location management server 20. In such a case, the CPU 101 of the gateway 10 receives, from the external apparatus via the network 24, a result of traffic line analysis performed by the external apparatus, for example.

If the wireless communication terminal 14 is located within the A-region (step S4081, "A-region"), the CPU 101 of the gateway 10 predicts that the indoor radio environment of the factory 26 is a suitable radio environment for the 5 GHz band (step S4082).

Further, if the wireless communication terminal is located within the B-region (step S4081, "B-region"), the CPU 101 of the gateway 10 predicts that the indoor radio environment of the factory 26 is a suitable radio environment for the 2.4 GHz band (step S4083).

Further, if the wireless communication terminal is located within the C-region (step S4081, "C-region"), the CPU 101 of the gateway 10 predicts that the indoor radio environment of the factory 26 is a suitable radio environment for the 920 MHz band (step S4084).

Next, in the gateway 10, the CPU 101 functions as the communication control unit and determines whether or not to switch the frequency band of wireless communication with the wireless communication terminal based on a prediction result of the radio environment in step S408 described above (step S410).

First, if the CPU 101 determines that the radio environment is suitable for the 5 GHz band (step S4082) and when the current frequency band of the wireless communication with the wireless communication terminal 14 is other than the 5 GHz band, the CPU 101 determines to switch the frequency band (step S410, YES). That is, the CPU 101 determines to switch the frequency band of the wireless communication with the wireless communication terminal 14 from the 2.4 GHz band or the 920 MHz band to the 5 GHz band.

On the other hand, if the CPU 101 determines that the radio environment is suitable for the 5 GHz band (step S4082) and when the current frequency band of the wireless communication with the wireless communication terminal 14 is the 5 GHz band, the CPU 101 determines not to switch the frequency band (step S410, NO). In this case, the CPU 101 proceeds to step S404 and regularly or irregularly performs request for location information on the wireless communication terminal 14 of step S404 and prediction of the radio environment of step S408.

Further, if the CPU 101 determines that the radio environment is suitable for the 2.4 GHz band (step S4083) and when the current frequency band of the wireless communication with the wireless communication terminal 14 is other than the 2.4 GHz band, the CPU 101 determines to switch the frequency band (step S410, YES). That is, the CPU 101 determines to switch the frequency band of the wireless communication with the wireless communication terminal 14 from the 5 GHz band or the 920 MHz band to the 2.4 GHz band.

On the other hand, if the CPU 101 determines that the radio environment is suitable for the 2.4 GHz band (step S4083) and when the current frequency band of the wireless communication with the wireless communication terminal 14 is the 2.4 GHz band, the CPU 101 determines not to switch the frequency band (step S410, NO). In this case, the CPU 101 proceeds to step S404 and regularly or irregularly performs request for location information on the wireless communication terminal 14 of step S404 and prediction of the radio environment of step S408.

Further, if the CPU 101 determines that the radio environment is suitable for the 920 MHz band (step S4084) and when the current frequency band of the wireless communication with the wireless communication terminal 14 is other than the 920 MHz band, the CPU 101 determines to switch the frequency band (step S410, YES). That is, the CPU 101 determines to switch the frequency band of the wireless communication with the wireless communication terminal 14 from the 2.4 GHz band or the 5 GHz band to the 920 MHz band.

On the other hand, if the CPU 101 determines that the radio environment is suitable for the 920 MHz band (step S4084) and when the current frequency band of the wireless communication with the wireless communication terminal 14 is the 920 MHz band, the CPU 101 determines not to switch the frequency band (step S410, NO). In this case, the CPU 101 proceeds to step S404 and regularly or irregularly performs request for location information on the wireless communication terminal 14 of step S404 and prediction of the radio environment of step S408.

As described above, if it is determined to switch the frequency band of wireless communication (step S410, YES), the CPU 101 of the gateway 10 notifies the wireless communication terminal 14 of the switched new frequency band over the currently established wireless communication (step S412).

Next, in the gateway 10, the CPU 101 functions as the communication control unit and controls the wireless communication unit 105. Thereby, the CPU 101 switches the frequency band used for wireless communication with the wireless communication terminal 14 to a new frequency band (step S414).

Further, in the wireless communication terminal 14, the CPU 141 functions as the communication control unit and controls the wireless communication unit 145. Thereby, the CPU 141 switches the frequency band used for wireless communication with the gateway 10 to a new frequency band notified from the gateway 10 (step S416).

Next, the gateway 10 and the wireless communication terminal 14 establish and perform wireless communication therebetween in the switched new frequency band in accordance with a specification of wireless communication (step S418). Here, the CPU 101 of the gateway 10 functions as the communication control unit. That is, the CPU 101 controls the communication unit corresponding to the switched new frequency band of the 2.4 GHz band communication unit 105a, the 5 GHz band communication unit 105b, and the 920 MHz band communication unit 105c and wirelessly communicates with the wireless communication terminal 14. Further, the CPU 141 of the wireless communication terminal 14 functions as the communication control unit. That is, the CPU controls the communication unit corresponding to the switched new frequency band of the 2.4 GHz band communication unit 145a, the 5 GHz band communication unit 145b, and the 920 MHz band communication unit 145c and wirelessly communicates with the gateway 10.

In such a way, according to the present example embodiment, since switching of the frequency band to be used in wireless communication between the gateway 10 and the wireless communication terminal 14 is controlled based on location information on the wireless communication terminal 14, interruption of wireless communication can be suppressed. Therefore, according to the present example embodiment, it is possible to realize reliable and stable wireless communication even in an unstable radio environment such as the indoor of the factory 26.

Note that, also in the present example embodiment, the gateway 10 can be further configured to predict the radio environment based on time information regarding the working period and control switching of the frequency band of wireless communication in the same manner as the first example embodiment.

Further, also in the present example embodiment, the gateway 10 can be further configured to predict the radio environment based on operation information on an apparatus and control switching of the frequency band of wireless communication in the same manner as the second example embodiment.

Further, also in the present example embodiment, the gateway 10 can be further configured to predict the radio environment based on location information on a mobile object and image information and control switching of the frequency band of wireless communication in the same manner as the third example embodiment.

Fifth Example Embodiment

Figure 15:
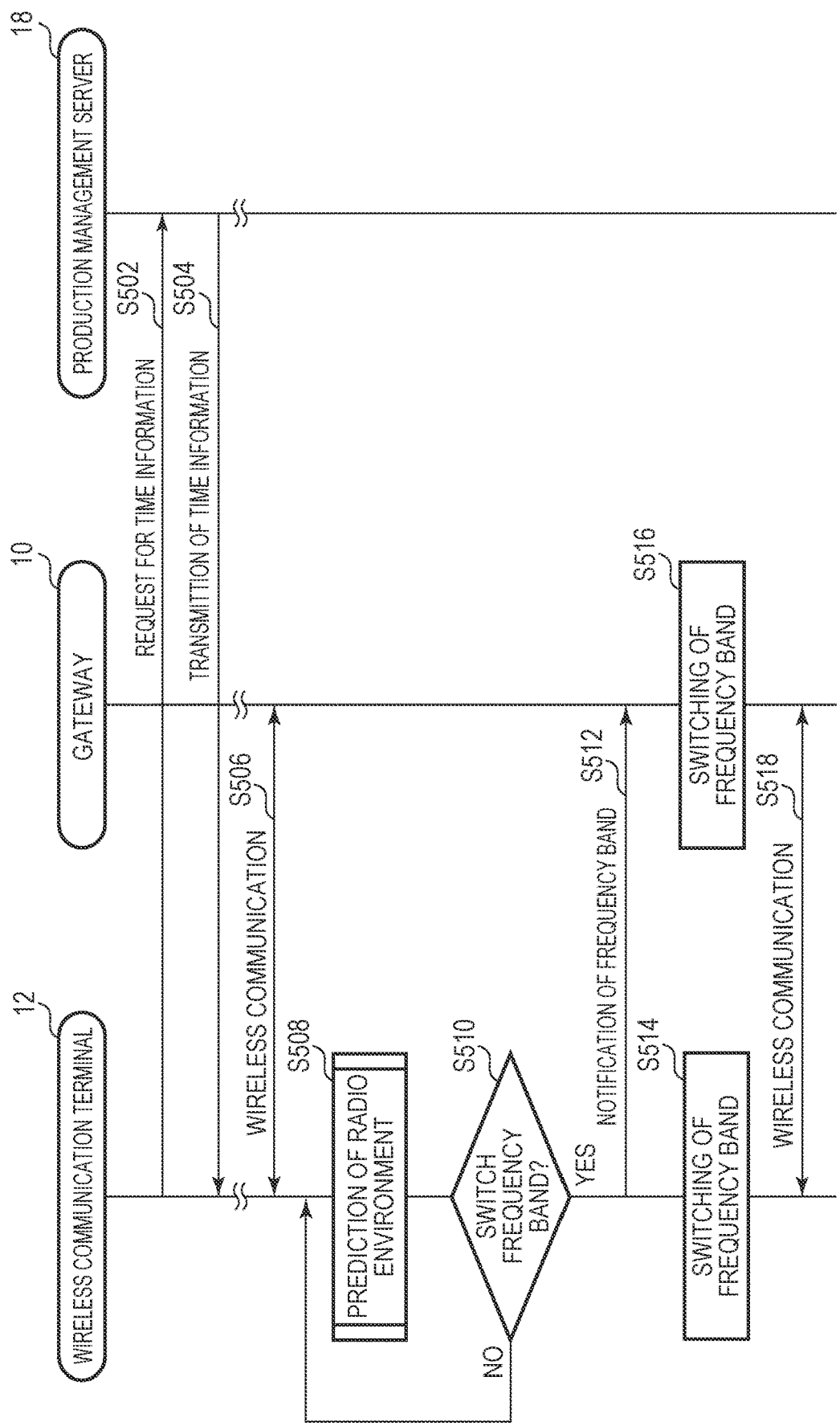
FIG. 15 is a sequence diagram illustrating a wireless communication method according to a fifth example embodiment of the present invention.

A wireless communication system, a wireless communication device, a wireless communication terminal, and a wireless communication method according to a fifth example embodiment of the present invention will be described by using FIG. 1, FIG. 2, and FIG. 15. FIG. 15 is a sequence diagram illustrating a wireless communication method according to the present example embodiment. Note that similar components to those of the wireless communication system, the wireless communication device, the wireless communication terminal, and the wireless communication method according to the first to fourth example embodiments described above will be labeled with the same references, and the description thereof will be omitted or simplified.

In the first to fourth example embodiments described above, request for information used in prediction of the radio environment (steps S102, S204, S304, S308, S404) is performed in the gateway 10. Further, prediction of the radio environment (steps S108, S208, S312, S408) is performed in the gateway 10. Further, determination as to whether or not to switch the frequency band (steps S110, S210, S314, S410) is performed in the gateway 10. Furthermore, notification of the switched new frequency band (S112, S212, S316, S412) is performed in the gateway 10. However, request for information used in prediction of the radio environment, prediction of the radio environment, determination as to whether or not to switch the frequency band, notification of the switched new frequency band, and the like are not necessarily required to be performed in the gateway 10. These processes may be performed in the wireless communication terminal 12 or the wireless communication terminal 14 that is a target of wireless communication.

In the present example embodiment, when corresponding to the first example embodiment, a form where request for information used in prediction of the radio environment, prediction of the radio environment, determination as to whether or not to switch the frequency band, notification of the switched new frequency band, and the like are performed in the wireless communication terminal 12 will be described.

First, as illustrated in FIG. 15, in the wireless communication terminal 12, the CPU 121 requests time information regarding the working period of the factory 26 from the production management server 18 via the network 24 (step S502). In response to the request for time information from the wireless communication terminal 12, the production management server 18 transmits time information regarding the working period of the factory 26 to the wireless communication terminal 12 (step S504). In the wireless communication terminal 12, the CPU 121 receives the time information regarding the working period transmitted from the production management server 18 and stores the received time information in the storage device 124.

In such a way, in the wireless communication terminal 12, the CPU 121 functions as an information acquisition unit and acquires in advance time information regarding the working period of the factory from the production management server 18 via the network 24. Note that the CPU 121 can acquire time information regarding the working period regularly or irregularly and update time information regarding the working period.

The wireless communication terminal 12 establishes and performs wireless communication with the gateway 10 in any one frequency band of the 2.4 GHz band and the 920 MHz band in accordance with a specification of wireless communication in the same manner as in the first example embodiment (step S506).

In the wireless communication terminal 12 that has established wireless communication with the gateway 10, the CPU 121 functions as the prediction unit and predicts the indoor radio environment of the factory 26 based on time information regarding the working period of the factory 26 (step S508).

In a prediction process of the radio environment, the CPU 121 references time information regarding the working period acquired from the production management server 18 and determines whether or not the current time is within the working period of the factory 26. Note that the CPU 121 can use information regarding the current time set in the wireless communication terminal as the information regarding the current time. Further, as the information regarding the current time, the CPU 121 can also use time information regarding the current time acquired from the external server such as the production management server 18, an NTP server, or the like.

A database that records a relationship between time information and a predicted radio environment is stored in the storage device 124 of the wireless communication terminal 12. In the wireless communication terminal 12, the CPU 121 that functions as the prediction unit references the databased stored in the storage device 124 and predicts the indoor radio environment of the factory 26. Note that the database used in prediction of the radio environment is not necessarily required to be stored in the storage device 124 of the wireless communication terminal 12 and may be stored in an external apparatus such as the gateway management apparatus 16, the production management server 18, or the like.

The CPU 121 of the wireless communication terminal 12 can perform a process to predict the radio environment in the same manner as the CPU 101 of the gateway 10 in the first example embodiment.

Next, in the wireless communication terminal 12, the CPU 121 functions as the communication control unit and determines whether or not to switch the frequency band of wireless communication with respect to the gateway 10 based on the prediction result of the radio environment obtained in step S508 described above (step S510).

The CPU 121 of the wireless communication terminal 12 can determine whether or not to switch the frequency band of wireless communication in the same manner as the CPU 101 of the gateway 10 in the first example embodiment.

If it is determined not to switch the frequency of the wireless communication (step S510, NO), the CPU 121 of the wireless communication terminal 12 proceeds to step S508 and regularly or irregularly performs prediction of the radio environment of step S508.

On the other hand, if it is determined to switch the frequency band of the wireless communication (step S510, YES), the CPU 121 of the wireless communication terminal 12 notifies the gateway 10 of the switched new frequency band over the currently established wireless communication (step S512).

Next, in the wireless communication terminal 12, the CPU 121 functions as the communication control unit and controls the wireless communication unit 125. Thereby, the CPU 121 switches the frequency band used for wireless communication with the gateway 10 to a new frequency band (step S514).

Further, in the gateway 10, the CPU 101 functions as the communication control unit and controls the wireless communication unit 105. Thereby, the CPU 101 switches the frequency band used for wireless communication with the wireless communication terminal 12 to a new frequency band notified from the wireless communication terminal 12 (step S516).

Next, the gateway 10 and the wireless communication terminal 12 establish and perform wireless communication therebetween in the switched new frequency band in accordance with a specification of wireless communication in the same manner as the first example embodiment (step S518).

As with the present example embodiment, when corresponding to the first example embodiment, request for information used in prediction of the radio environment, prediction of the radio environment, determination as to whether or not to switch the frequency band, notification of the switched new frequency band, and the like may be performed in the wireless communication terminal 12.

Note that, also when corresponding to the second example embodiment, request for information used in prediction of the radio environment, prediction of the radio environment, determination as to whether or not to switch the frequency band, notification of the switched new frequency band, and the like may be performed in the wireless communication terminal 12 in the same manner as in the present example embodiment. Also when corresponding to the third and fourth example embodiments, request for information used in prediction of the radio environment, prediction of the radio environment, determination as to whether or not to switch the frequency band, notification of the switched new frequency band, and the like may be performed in the wireless communication terminal 14 in the same manner as in the present example embodiment.

Sixth Example Embodiment

Figure 16:
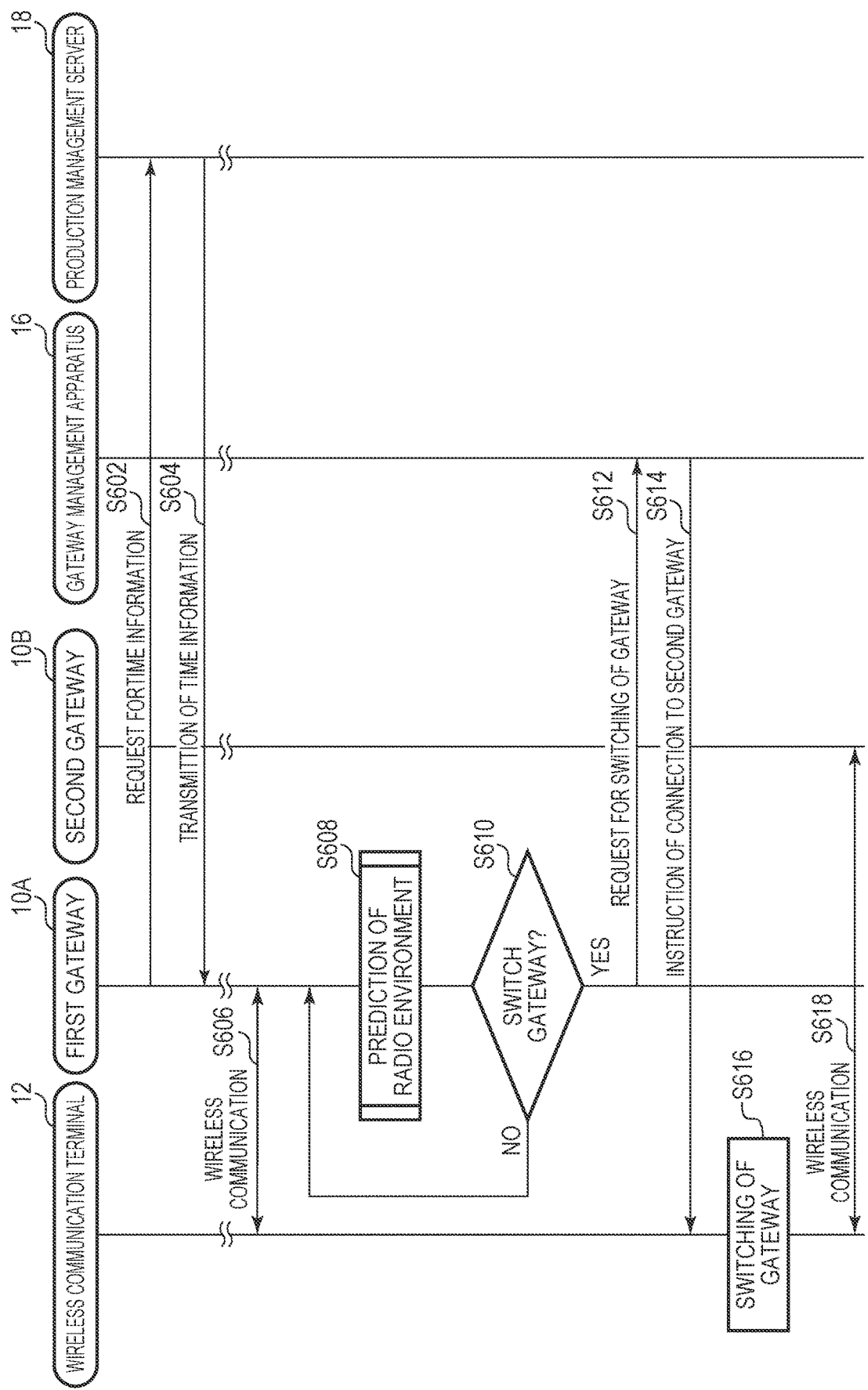
FIG. 16 is a sequence diagram illustrating a wireless communication method according to a sixth example embodiment of the present invention.

A wireless communication system, a wireless communication device, a wireless communication terminal, and a wireless communication method according to a sixth example embodiment of the present invention will be described by using FIG. 1, FIG. 2, and FIG. 16. FIG. 16 is a sequence diagram illustrating a wireless communication method according to the present example embodiment. Note that similar components to those of the wireless communication system, the wireless communication device, the wireless communication terminal, and the wireless communication method according to the first to fifth example embodiments described above will be labeled with the same references, and the description thereof will be omitted or simplified.

In the first to fifth example embodiments described above, while the case where switching of the frequency band used in wireless communication is controlled based on a prediction result of the radio environment has been described, the invention is not limited thereto. Instead of controlling switching of the frequency band used in wireless communication, switching of the gateway 10 which wirelessly communicates with the wireless communication terminal 12 or 14 may be controlled. That is, switching of the wireless communication terminal that is a target of wireless communication may be controlled from the view point of the gateway 10. Further, switching of the gateway 10 that is a target of wireless communication may be controlled from the view point of the wireless communication terminal 12 or 14.

In the present example embodiment, when corresponding to the first example embodiment, a form in which switching of the gateway 10 with which the wireless communication terminal 12 wirelessly communicates is controlled instead of controlling the switching of the frequency band used in wireless communication will be described. Note that, hereinafter, out of the plurality of gateways 10, a gateway used before switching is referred to as a first gateway 10A, and a gateway used after switching is referred to as a second gateway 10B.

First, as illustrated in FIG. 16, in the first gateway 10A, the CPU 101 requests time information regarding the working period of the factory 26 from the production management server 18 via the network 24 in the same manner as in the gateway 10 of the first example embodiment (step S602). In response to the request for time information from the first gateway 10A, the production management server 18 transmits time information regarding the working period of the factory 26 to the first gateway 10A (step S604). In the first gateway 10A, the CPU 101 receives the time information regarding the working period transmitted from the production management server 18 and stores the received time information in the storage device 104.

In such a way, in the first gateway 10A, the CPU 101 functions as an information acquisition unit and acquires in advance time information regarding the working period of the factory 26 from the production management server 18 via the network 24.

The wireless communication terminal 12 establishes and performs wireless communication with the first gateway 10A in any one frequency band of the 2.4 GHz band and the 920 MHz band in accordance with a specification of wireless communication in the same manner as in the first example embodiment (step S606).

In the first gateway 10A that has established wireless communication with the wireless communication terminal 12, the CPU 101 functions as the prediction unit and predicts the indoor radio environment of the factory 26 based on time information regarding the working period of the factory 26 (step S608).

The CPU 101 of the first gateway 10A can perform a process to predict the radio environment in the same manner as the CPU 101 of the gateway 10 in the first example embodiment.

Next, in the first gateway 10A, the CPU 101 functions as the communication control unit and determines whether or not to switch the gateway 10 used for performing wireless communication based on the prediction result of the radio environment obtained in step S608 described above (step S610).

A database that records a relationship between a predicted indoor radio environment of the factory 26 and the gateway 10 suitable for the predicted radio environment is stored in the storage device 104 of each of the gateways 10. The gateway 10 which is suitable for a predicted radio environment has been determined from the location of the gateway 10, a radio wave intensity, a corresponding frequency band, or the like. Note that this database is not necessarily required to be stored in the storage device 104 of the gateway 10 and may be stored in an external apparatus such as the gateway management apparatus 16, the production management server 18, or the like.

In the first gateway 10A, the CPU 10 determines whether or not to switch the gateway 10 used for performing wireless communication with reference to the database described above.

First, if the first gateway 10A is more suitable for the predicted radio environment than other gateways 10, in the first gateway 10A, the CPU 10 determines not to switch the gateway 10 (step S610, NO). In this case, the CPU 101 of the first gateway 10A proceeds to step S608 and regularly or irregularly performs prediction of the radio environment of step S608.

On the other hand, if the second gateway 10B is more suitable for the predicted radio environment than other gateways 10, in the first gateway 10A, the CPU 101 determines to switch the gateway 10 (step S610, YES). That is, the CPU 101 of the first gateway 10A determines to switch the first gateway 10A to the second gateway 10B.

If it is determined to switch the gateway 10 (step S610, YES), in the first gateway 10A, the CPU 101 transmits a switch request of the gateway 10 to the gateway management apparatus 16 (step S612). The switch request of the gateway 10 is to request to switch the gateway 10 used for performing wireless communication with the wireless communication terminal 12 from the first gateway 10A to the second gateway 10B.

In response to receiving the switching request of the gateway 10, the gateway management apparatus 16 transmits, to the wireless communication terminal 12, a connection instruction to the second gateway 10B (step S614).

In the wireless communication terminal 12, the CPU 121 switches the gateway 10 used for performing wireless communication from the first gateway 10A to the second gateway 10B (step S616). In such a way, the wireless communication terminal 12 establishes and performs wireless communication with the second gateway 10B (step S618).

As with the present example embodiment, when corresponding to the first example embodiment, switching of the gateway 10 with which the wireless communication terminal 12 wirelessly communicates may be controlled instead of controlling the switching of the frequency band used in wireless communication.

Note that, also when corresponding to the second to fifth example embodiments, switching of the gateway 10 with which the wireless communication terminal 12 or 14 wirelessly communicates may be controlled instead of controlling the switching of the frequency band used in wireless communication in the same manner as in the present example embodiment.

Other Example Embodiments

Figure 17:
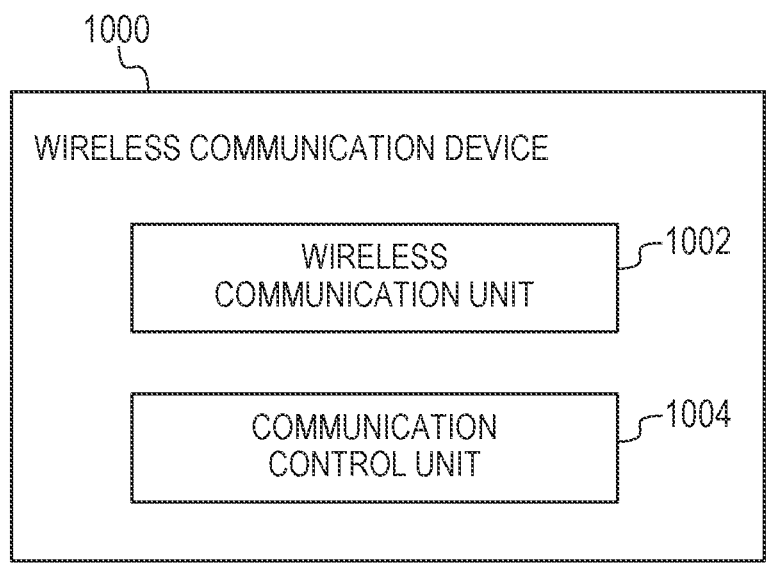
FIG. 17 is a block diagram illustrating a function configuration of a wireless communication device according to another example embodiment of the present invention.
Figure 18:
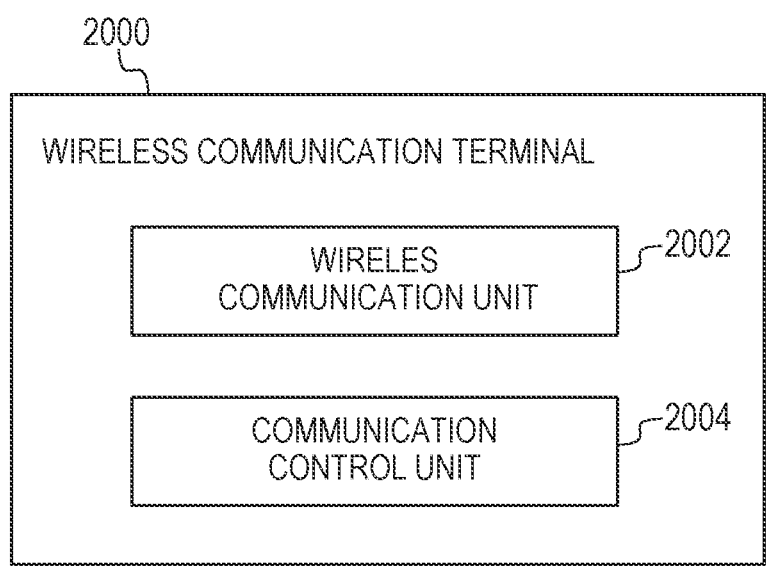
FIG. 18 is a block diagram illustrating a function configuration of a wireless communication terminal according to another example embodiment of the present invention.
Figure 19:
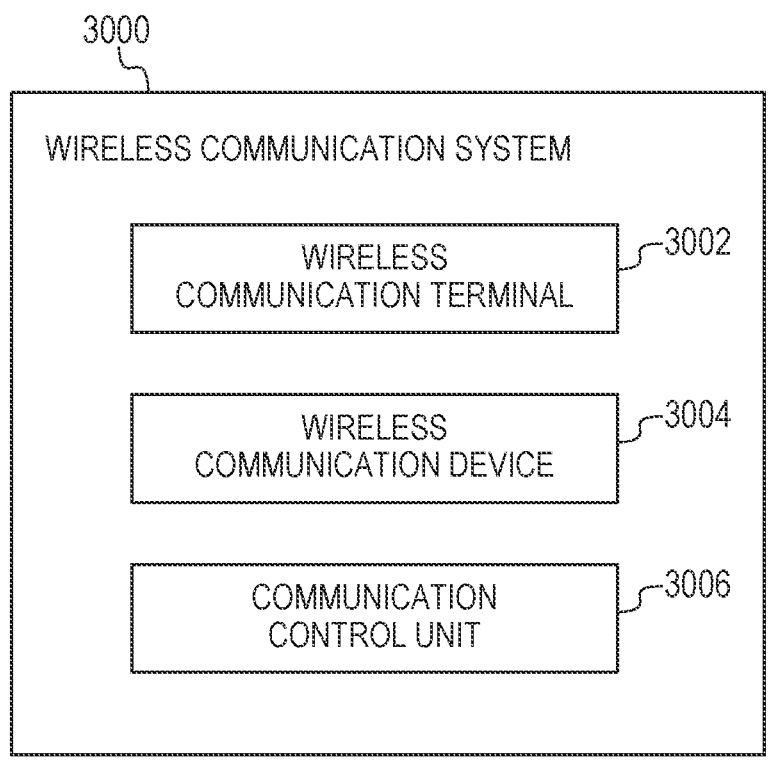
FIG. 19 is a block diagram illustrating a function configuration of a wireless communication system according to another example embodiment of the present invention.

According to another example embodiment, the wireless communication device, the wireless communication terminal, and the wireless communication system described in each example embodiment described above may also be configured as illustrated in FIG. 17 to FIG. 19.

FIG. 17 is a block diagram illustrating a function configuration of a wireless communication device according to the another example embodiment. As illustrated in FIG. 17, a wireless communication device 1000 according to the another example embodiment has a wireless communication unit 1002 capable of wirelessly communicating with a wireless communication terminal. Further, the wireless communication device 1000 has a communication control unit 1004 that controls at least one of switching of a frequency band of the wireless communication and switching of a wireless communication terminal based on at least one of time information and peripheral information indicating the status of a peripheral object.

FIG. 18 is a block diagram illustrating a function configuration of a wireless communication terminal according to the another example embodiment. As illustrated in FIG. 18, a wireless communication terminal 2000 according to the another example embodiment has a wireless communication unit 2002 capable of wirelessly communicating with a wireless communication device. Further, the wireless communication terminal 2000 has a communication control unit 2004 that controls at least one of switching of a frequency band of the wireless communication and switching of a wireless communication device based on at least one of time information and peripheral information indicating the status of a peripheral object.

FIG. 19 is a block diagram illustrating a function configuration of a wireless communication system according to the another example embodiment. As illustrated in FIG. 19, a wireless communication system 3000 according to the another example embodiment has a wireless communication terminal 3002 and a wireless communication device 3004 capable of wirelessly communicating with a wireless communication terminal 3002. Further, the wireless communication system 3000 has a communication control unit 3006 that, based on at least one of time information and peripheral information indicating the status of a peripheral object, controls at least one of switching of a frequency band of the wireless communication and switching of the wireless communication device 3004 with which the wireless communication terminal 3002 wirelessly communicates.

According to the another example embodiment, since at least one of switching of the frequency band of wireless communication and switching of a wireless communication terminal or a wireless communication device is controlled based on at least one of time information and peripheral information indicating the status of a peripheral object, interference with the wireless communication can be suppressed. Therefore, according to such another example embodiment, it is possible to realize reliable and stable wireless communication even in an unstable radio environment.

Figure 20:
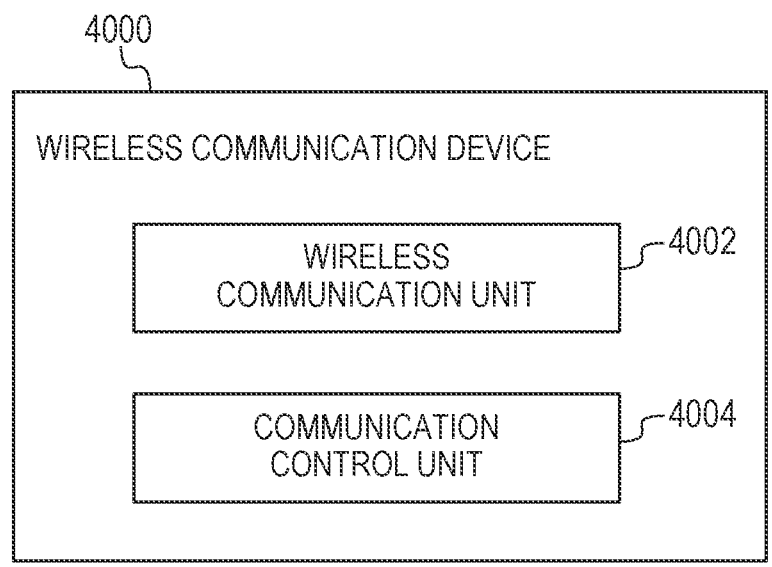
FIG. 20 is a block diagram illustrating a function configuration of a wireless communication device according to yet another example embodiment of the present invention.
Figure 21:
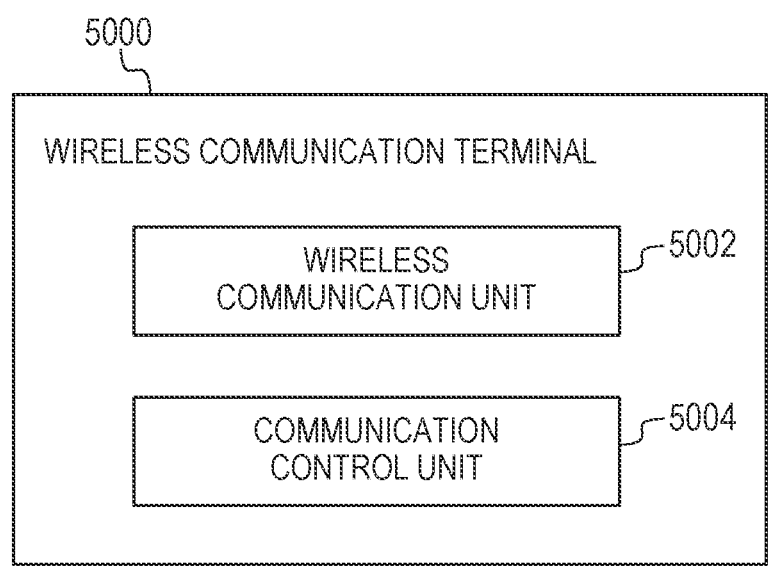
FIG. 21 is a block diagram illustrating a function configuration of a wireless communication terminal according to yet another example embodiment of the present invention.
Figure 22:
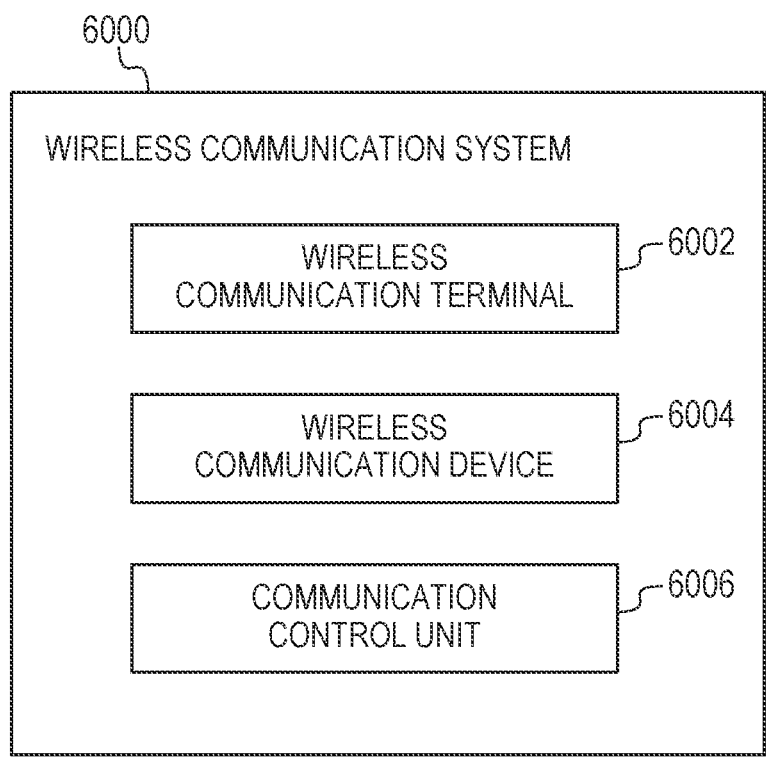
FIG. 22 is a block diagram illustrating a function configuration of a wireless communication system according to yet another example embodiment of the present invention.

According to yet another example embodiment, the wireless communication device, the wireless communication terminal, and the wireless communication system described in each example embodiment described above may also be configured as illustrated in FIG. 20 to FIG. 22.

FIG. 20 is a block diagram illustrating a function configuration of a wireless communication device according to the yet another example embodiment. As illustrated in FIG. 20, a wireless communication device 4000 according to the yet another example embodiment has a wireless communication unit 4002 capable of wirelessly communicating with a wireless communication terminal. Further, the wireless communication device 4000 has a communication control unit 4004 that controls switching of a frequency band of the wireless communication based on location information on the wireless communication terminal.

FIG. 21 is a block diagram illustrating a function configuration of a wireless communication terminal according to the yet another example embodiment. As illustrated in FIG. 21, a wireless communication terminal 5000 according to the yet another example embodiment has a wireless communication unit 5002 capable of wirelessly communicating with a wireless communication device. Further, the wireless communication terminal 5000 has a communication control unit 5004 that controls switching of a frequency band of the wireless communication based on location information on the wireless communication terminal 5000.

FIG. 22 is a block diagram illustrating a function configuration of a wireless communication terminal according to the yet another example embodiment. As illustrated in FIG. 22, a wireless communication system 6000 according to the yet another example embodiment has a wireless communication terminal 6002 and a wireless communication device 6004 capable of wirelessly communicating with a wireless communication terminal 6002. Further, the wireless communication system 6000 has a communication control unit 6006 that controls switching of a frequency band of the wireless communication based on location information on the wireless communication terminal.

According to the yet another example embodiment, since switching of the frequency band of wireless communication is controlled based on location information on a wireless communication terminal, interruption of the wireless communication can be suppressed. Therefore, according to such yet another example embodiment, it is possible to realize reliable and stable wireless communication even in an unstable radio environment.

Modified Example Embodiment

The present invention is not limited to the example embodiments described above, and various modifications are possible.

For example, while the case where the facility where the gateway 10 is installed is the factory 26 has been described as an example in the above example embodiments, the invention is not limited thereto. The gateway 10 may be installed in a public facility such as a station, an airport, or the like or other facilities in addition to a factory.

Further, while the case where the gateway 10 is installed indoor has been described as an example in the above example embodiment, the invention is not limited thereto. The gateway 10 may be installed outdoor a facility.

Further, while the case where the gateway 10 and the wireless communication terminals 12 and 14 perform wireless communication in any of the 2.4 GHz band, the 5 GHz band, and the 920 MHz band has been described as an example in the above example embodiment, the invention is not limited thereto. The gateway 10 and the wireless communication terminals 12 and 14 may be any entity that can perform wireless communication in a plurality of frequency bands different from each other.

Further, while the case of controlling the frequency band of wireless communication to be switched between the 2.4 GHz band and the 920 MHz band or between the 2.4 GHz band, the 5 GHz band, and the 920 MHz band has been described in the above example embodiment, the invention is not limited thereto. A plurality of frequency bands to be switched may be selected in accordance with the frequency band of noise generated by an apparatus, the status of obstruction by an obstruction object, a mobile range of the wireless communication terminal 14 that wirelessly communicates with the gateway 10, or the like.

Further, while the case where location information on the wireless communication terminal 14 is acquired by an indoor positioning system using a UWB, a wireless LAN, or the like has been described as an example in the above example embodiment, the invention is not limited thereto. For example, the location of the wireless communication terminal 14 may be estimated and location information thereof may be acquired based on location information on an authentication place such as a gate where biometrics authentication is performed on the worker W carrying the wireless communication terminal 14.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a Compact Disc-Read Only Memory (CD-ROM), a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The service realized by the function of each example embodiment described above may be provided in a form of Software as a Service (SaaS) to the user.

The whole or part of the example embodiments disclosed above can be described as, but not limited to, the following supplementary notes.

(Supplementary Note 1)

A wireless communication device comprising:

a wireless communication unit capable of wirelessly communicating with a wireless communication terminal; and a communication control unit that controls at least one of switching of a frequency band of the wireless communication and switching of the wireless communication terminal based on at least one of time information and peripheral information indicating a status of a peripheral object.

(Supplementary Note 2)

The wireless communication device according to supplementary note 1, wherein the communication control unit controls at least one of switching of the frequency band of the wireless communication and switching of the wireless communication terminal in accordance with a radio environment predicted based on at least one of the time information and the peripheral information.

(Supplementary Note 3)

The wireless communication device according to supplementary note 1 or 2, wherein the wireless communication device is installed in a facility in which the wireless communication terminal is used, and wherein the time information is information regarding planned time of the facility.

(Supplementary Note 4)

The wireless communication device according to any one of supplementary notes 1 to 3, wherein the peripheral information is location information on the peripheral object.

(Supplementary Note 5)

The wireless communication device according to supplementary note 4, wherein the wireless communication device is installed inside a facility in which the wireless communication terminal is used, wherein the peripheral object is an object inside the facility, and wherein the location information is acquired by an indoor positioning system.

(Supplementary Note 6)

The wireless communication device according to any one of supplementary notes 1 to 5, wherein the peripheral information is image information obtained by capturing the peripheral object.

(Supplementary Note 7)

A wireless communication terminal comprising:

a wireless communication unit capable of wirelessly communicating with a wireless communication device; and a communication control unit that controls at least one of switching of a frequency band of the wireless communication and switching of the wireless communication device based on at least one of time information and peripheral information indicating a status of a peripheral object.

(Supplementary Note 8)

The wireless communication terminal according to supplementary note 7, wherein the communication control unit controls at least one of switching of the frequency band of the wireless communication and switching of the wireless communication device in accordance with a radio environment predicted based on at least one of the time information and the peripheral information.

(Supplementary Note 9)

The wireless communication terminal according to supplementary note 7 or 8, wherein the wireless communication terminal is used in a facility in which the wireless communication device is installed, and wherein the time information is information regarding planned time of the facility.

(Supplementary Note 10)

The wireless communication terminal according to any one of supplementary notes 7 to 9, wherein the peripheral information is location information on the peripheral object.

(Supplementary Note 11)

The wireless communication terminal according to supplementary note 10, wherein the wireless communication terminal is used inside a facility in which the wireless communication device is installed, wherein the peripheral object is an object inside the facility, and wherein the location information is acquired by an indoor positioning system.

(Supplementary Note 12)

The wireless communication terminal according to any one of supplementary notes 7 to 11, wherein the peripheral information is image information obtained by capturing the peripheral object.

(Supplementary Note 13)

A wireless communication system comprising:

a wireless communication terminal;

a wireless communication device capable of wirelessly communicating with the wireless communication terminal; and a communication control unit that, based on at least one of time information and peripheral information indicating a status of a peripheral object, controls at least one of switching of a frequency band of the wireless communication and switching of the wireless communication device with which the wireless communication terminal wirelessly communicates.

(Supplementary Note 14)

A wireless communication method comprising:

wirelessly communicating with a wireless communication terminal; and controlling at least one of switching of a frequency band of the wireless communication and switching of the wireless communication terminal based on at least one of time information and peripheral information indicating a status of a peripheral object.

(Supplementary Note 15)

A storage medium storing a program that causes a computer to perform:

wirelessly communicating with a wireless communication terminal; and controlling at least one of switching of a frequency band of the wireless communication and switching of the wireless communication terminal based on at least one of time information and peripheral information indicating a status of a peripheral object.

(Supplementary Note 16)

A wireless communication method comprising:

wirelessly communicating with a wireless communication device; and controlling at least one of switching of a frequency band of the wireless communication and switching of the wireless communication device based on at least one of time information and peripheral information indicating a status of a peripheral object.

(Supplementary Note 17)

A storage medium storing a program that causes a computer to perform:

wirelessly communicating with a wireless communication device; and controlling at least one of switching of a frequency band of the wireless communication and switching of the wireless communication device based on at least one of time information and peripheral information indicating a status of a peripheral object.

(Supplementary Note 18)

A wireless communication device comprising:

a wireless communication unit capable of wirelessly communicating with a wireless communication terminal; and a communication control unit that controls switching of a frequency band of the wireless communication based on location information on the wireless communication terminal.

(Supplementary Note 19)

The wireless communication device according to supplementary note 18, wherein the communication control unit controls switching of the frequency band of the wireless communication in accordance with a radio environment predicted based on the location information.

(Supplementary Note 20)

The wireless communication device according to supplementary note 18 or 19, wherein the wireless communication device is installed inside a facility in which the wireless communication terminal is used, and wherein the location information is acquired by an indoor positioning system.

(Supplementary Note 21)

A wireless communication terminal comprising:

a wireless communication unit capable of wirelessly communicating with a wireless communication device; and a communication control unit that controls switching of a frequency band of the wireless communication based on location information on the wireless communication terminal.

(Supplementary Note 22)

The wireless communication terminal according to supplementary note 21, wherein the communication control unit controls switching of the frequency band of the wireless communication in accordance with a radio environment predicted based on the location information.

(Supplementary Note 23)

The wireless communication terminal according to supplementary note 21 or 22, wherein the wireless communication terminal is used inside a facility in which the wireless communication terminal is installed, and wherein the location information is acquired by an indoor positioning system.

(Supplementary Note 24)

A wireless communication system comprising:

a wireless communication terminal;

a wireless communication device capable of wirelessly communicating with the wireless communication terminal; and a communication control unit that controls switching of a frequency band of the wireless communication based on location information on the wireless communication terminal.

(Supplementary Note 25)

A wireless communication method comprising:

wirelessly communicating with a wireless communication terminal; and controlling switching of a frequency band of the wireless communication based on location information on the wireless communication terminal.

(Supplementary Note 26)

A storage medium storing a program that causes a computer to perform:

wirelessly communicating with a wireless communication terminal; and controlling switching of a frequency band of the wireless communication based on location information on the wireless communication terminal.

(Supplementary Note 27)

A wireless communication method performed by a wireless communication terminal, the wireless communication method comprising:

wirelessly communicating with a wireless communication device; and controlling switching of a frequency band of the wireless communication based on location information on the wireless communication terminal.

(Supplementary Note 28)

A storage medium storing a program that causes a computer forming a wireless communication terminal to perform:

wirelessly communicating with a wireless communication device; and controlling switching of a frequency band of the wireless communication based on location information on the wireless communication terminal.

As described above, while the present invention has been described with reference to the example embodiments, the present invention is not limited to the example embodiments described above. Various modifications that can be understood by those skilled in the art can be made to the feature or the details of the present invention within the scope of the present invention.

REFERENCE SIGNS LIST 1 wireless communication system
10 gateway
12, 14 wireless communication terminal
16 gateway management apparatus
18 production management server
20 location management server
22 image monitoring server
24 network
26 factory

The invention claimed is:

1. A wireless communication device configured to wirelessly communicate with a wireless communication terminal, comprising:

at least one memory configured to store instructions; and at least one processor configured to execute the instructions to:

acquire an image including a peripheral object around located the wireless communication device, wherein the image is captured by a camera;

receive, from an apparatus in a facility that generates noise in a first frequency band, via a wireless communication interface, time information regarding a scheduled time period of the apparatus;

predict a radio environment based on the time information, the acquired image, and peripheral information indicating location information on the peripheral object;

select, from among a plurality of frequency bands, a frequency band of wireless communication based on the predicted radio environment; and communicate with the wireless communication terminal via the wireless communication interface using the selected frequency band, wherein a second frequency band that is different than the first frequency band is selected as the selected frequency band in response to a current time being included in the scheduled time period.

2. The wireless communication device according to claim 1, wherein the wireless communication device is installed in the facility in which the wireless communication terminal is used, and wherein the time information is information regarding planned time of the facility.

3. The wireless communication device according to claim 1, wherein the wireless communication device is installed inside the facility in which the wireless communication terminal is used, wherein the peripheral object is an object inside the facility, and wherein the location information is acquired by an indoor positioning system.

4. The wireless communication device according to claim 1, wherein the wireless communication device is installed in the facility in which the wireless communication terminal is used.

5. The wireless communication device according to claim 1, wherein the peripheral object is an object inside the facility, and wherein the location information is acquired by an indoor positioning system.

6. The wireless communication device according to claim 1, wherein the scheduled time period indicates a start time and an end time for operation of the apparatus in the facility.

7. The wireless communication device according to claim 1, further comprising a transceiver, wherein the at least one processor is further configured to execute the instructions to receive, via the transceiver, the time information from a server.

8. The wireless communication device according to claim 7, wherein the at least one processor is further configured to execute the instructions to transmit, via the transceiver, a request for the server to transmit the time information.

9. The wireless communication device according to claim 1, wherein the at least one processor is further configured to execute the instructions to store the time information received from the apparatus in the at least one memory.

10. The wireless communication device according to claim 1, wherein the at least one processor is further configured to execute the instructions to:
   identify whether the current time is within the scheduled time period of the apparatus;
   select the second frequency band as the selected frequency band in response to the current time being within the scheduled time period, and
   select the first frequency band as the selected frequency band in response to the current time not being included in the scheduled time period.

11. The wireless communication device according to claim 1, wherein the scheduled time period indicates a first start time and a first end time for operation of the apparatus in the facility of a first day, and a second start time and a second end time for operation of the apparatus in the facility of a second day.

12. The wireless communication device according to claim 1, wherein the location information indicates where the peripheral object is located within the facility.

13. A wireless communication terminal configured to wirelessly communicate with a wireless communication device, comprising:
   at least one memory configured to store instructions; and
   at least one processor configured to execute the instructions to:
      acquire an image including a peripheral object around located the wireless communication device, wherein the image is captured by a camera;
      identify whether a current time is within a scheduled time period of an apparatus in a facility that generates noise in a first frequency band;
      predict a radio environment based on whether the current time is within the scheduled time period, the acquired image, and peripheral information indicating location information on the peripheral object;
      select, from among a plurality of frequency bands, a frequency band of wireless communication based on the predicted radio environment; and
      switch the wireless communication to the selected frequency band,
   wherein a second frequency band that is different than the first frequency band is selected as the selected frequency band in response to the current time being included in the scheduled time period.

14. The wireless communication terminal according to claim 13, wherein the wireless communication terminal is used in the facility in which the wireless communication device is installed, and
   wherein the scheduled time period indicates planned time of the facility.

15. A wireless communication system comprising:
   a wireless communication terminal;
   a wireless communication device capable of wirelessly communicating with the wireless communication terminal;
   at least one memory configured to store instructions; and
   at least one processor configured to execute the instructions to:
      acquire an image including a peripheral object around located the wireless communication device, wherein the image is captured by a camera;
      receive, from an apparatus in a facility that generates noise in a first frequency band, via a wireless communication interface, time information regarding a scheduled time period of the apparatus;
      predict a radio environment based on the time information, the acquired image, and peripheral information indicating location information on the peripheral object;
      select, from among a plurality of frequency bands, a frequency band of wireless communication based on the predicted radio environment; and
      communicate with the wireless communication terminal via the wireless communication interface using the selected frequency band,
   wherein a second frequency band that is different than the first frequency band is selected as the selected frequency band in response to a current time being included in the scheduled time period.

* * * * *